United States Patent [19]

Derkacs et al.

[11] 4,334,495

[45] Jun. 15, 1982

[54] METHOD AND APPARATUS FOR USE IN MAKING AN OBJECT

[75] Inventors: Thomas Derkacs, Mayfield; Charles W. Fetheroff, Willowick; Istvan M. Matay, North Royalton; Istvan J. Toth, Richmond Heights, all of Ohio

[73] Assignee: TRW Inc., Cleveland, Ohio

[21] Appl. No.: 923,693

[22] Filed: Jul. 11, 1978

[51] Int. Cl.² .................. B05B 3/14; B05B 12/00
[52] U.S. Cl. ...................... 118/669; 118/712; 118/313; 118/315; 118/320; 118/321; 118/503; 427/10; 427/423; 427/425
[58] Field of Search ............ 427/9, 10, 423, 425; 356/381, 354, 357; 118/7, 8, 9, 11, 47, 320, 321, 318, 503, 669, 712; 73/150 R

[56] References Cited

U.S. PATENT DOCUMENTS

| | | |
|---|---|---|
| 1,755,321 | 4/1930 | Hendrickson . |
| 3,016,464 | 1/1962 | Bailey . |
| 3,068,556 | 12/1962 | Kramer . |
| 3,137,756 | 6/1964 | Ganther et al. . |
| 3,395,278 | 7/1968 | McDivitt ............... 356/381 |
| 3,411,852 | 11/1968 | Marinozzi ............... 118/8 |
| 3,428,774 | 2/1969 | Faust et al. . |
| 3,570,449 | 3/1971 | Blecherman et al. ........ 118/9 |
| 3,606,162 | 9/1971 | Lehmann ............... 118/11 X |
| 3,627,973 | 12/1971 | Smith . |
| 3,645,623 | 2/1972 | Patten ..................... 356/381 |
| 3,711,312 | 1/1973 | Yoshida et al. ............. 117/34 |
| 3,716,021 | 2/1973 | Fry ....................... 118/318 X |
| 3,758,233 | 9/1973 | Cross ..................... 416/229 |
| 3,769,486 | 10/1973 | Braucht . |
| 3,775,582 | 11/1973 | Iceland ................. 219/125 PL |
| 3,778,580 | 12/1973 | Bierwith . |
| 3,792,928 | 2/1974 | Poilleux ..................... 356/4 |
| 3,853,093 | 12/1974 | Baker et al. ............... 118/9 X |
| 3,865,525 | 2/1975 | Dunn . |
| 3,915,114 | 10/1975 | Pelton ..................... 118/8 |
| 3,940,608 | 2/1976 | Kissinger et al. . |
| 3,953,704 | 4/1976 | Bejat et al. . |
| 4,003,115 | 1/1977 | Fisher ................. 29/156.8 R |
| 4,007,704 | 2/1977 | Hauiland ............... 118/320 |
| 4,028,787 | 6/1977 | Cretella et al. . |
| 4,050,133 | 9/1977 | Cretella et al. ........... 427/423 X |

FOREIGN PATENT DOCUMENTS

| | | |
|---|---|---|
| 2748490 | 3/1978 | Fed. Rep. of Germany . |
| 2743833 | 6/1978 | Fed. Rep. of Germany . |
| 2314531 | 1/1977 | France . |
| 946990 | 1/1964 | United Kingdom . |

Primary Examiner—Shrive P. Beck
Attorney, Agent, or Firm—Yount & Tarolli

[57] ABSTRACT

Although the method and apparatus of the present invention can be utilized to apply either a uniform or a nonuniform covering of material over many different workpieces, the apparatus (20) is advantageously utilized to apply a thermal barrier covering (64) to an airfoil (22) which is used in a turbine engine. The airfoil is held by a gripper assembly (86) while a spray gun (24) is effective to apply the covering over the airfoil. When a portion of the covering has been applied, a sensor (28) is utilized to detect the thickness of the covering. A control apparatus (32) compares the thickness of the covering of material which has been applied with the desired thickness and is subsequently effective to regulate the operation of the spray gun to adaptively apply a covering of a desired thickness with an accuracy of at least plus or minus 0.0015 inches (1.5 mils) despite unanticipated process variations.

177 Claims, 16 Drawing Figures

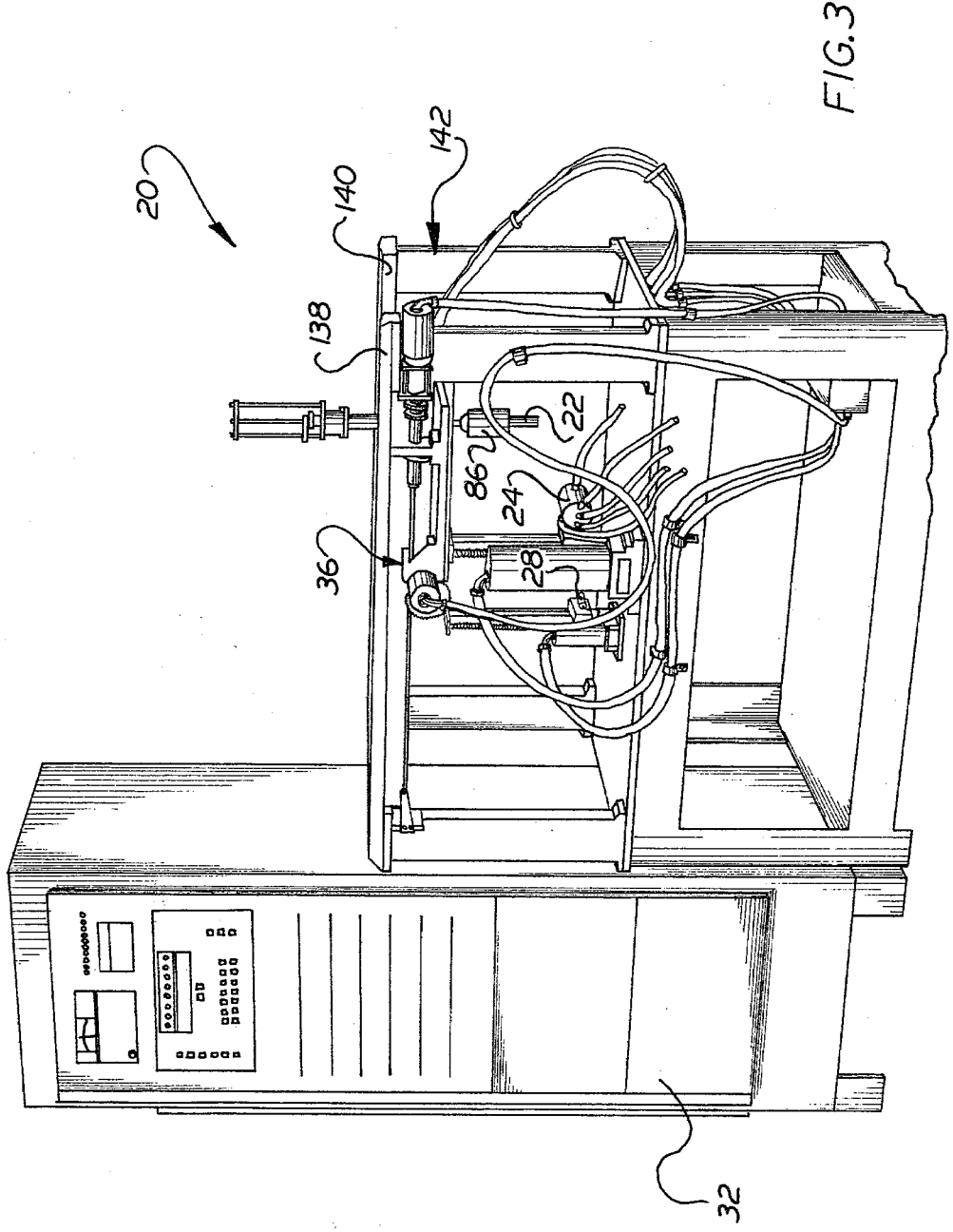

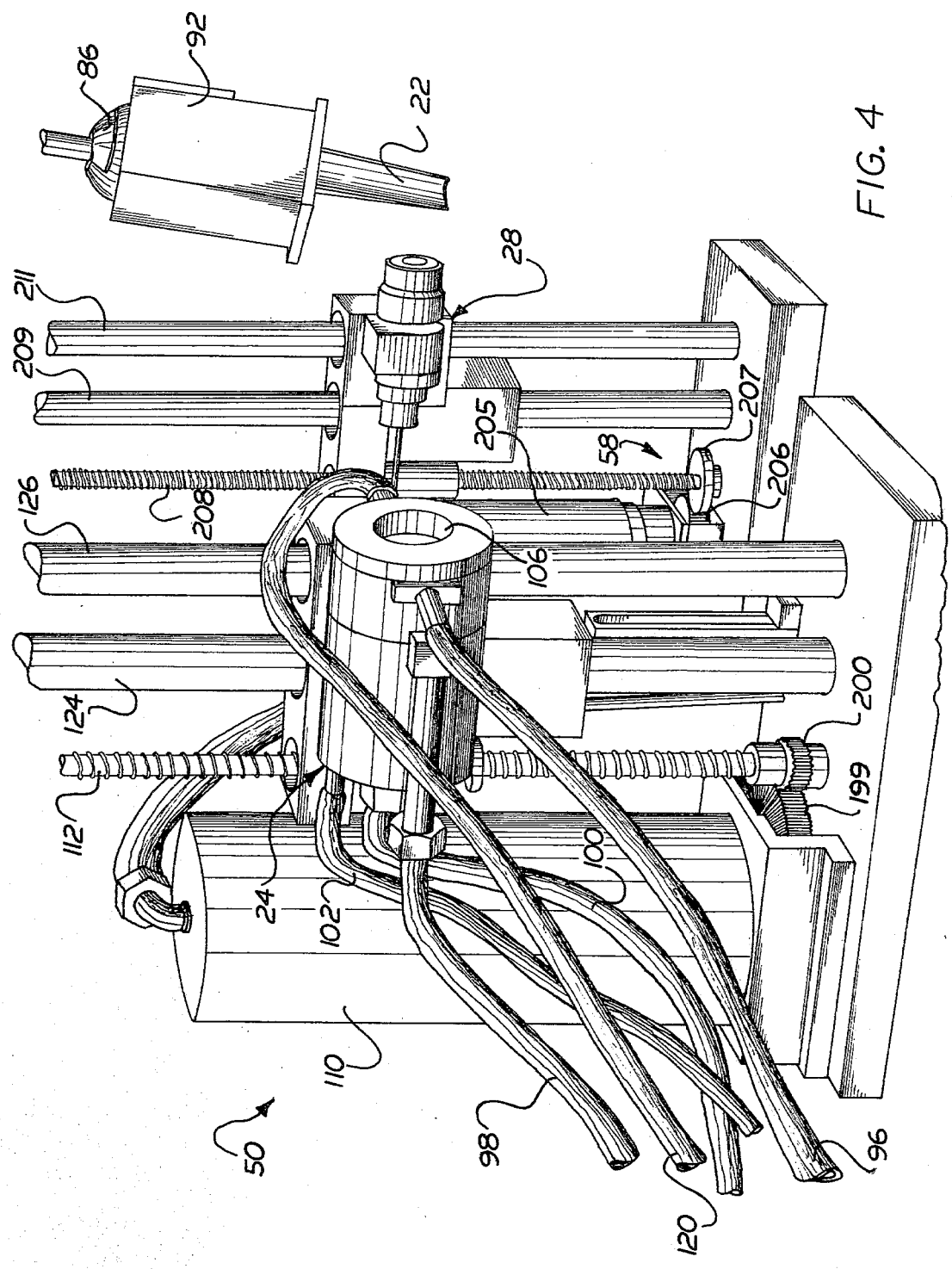

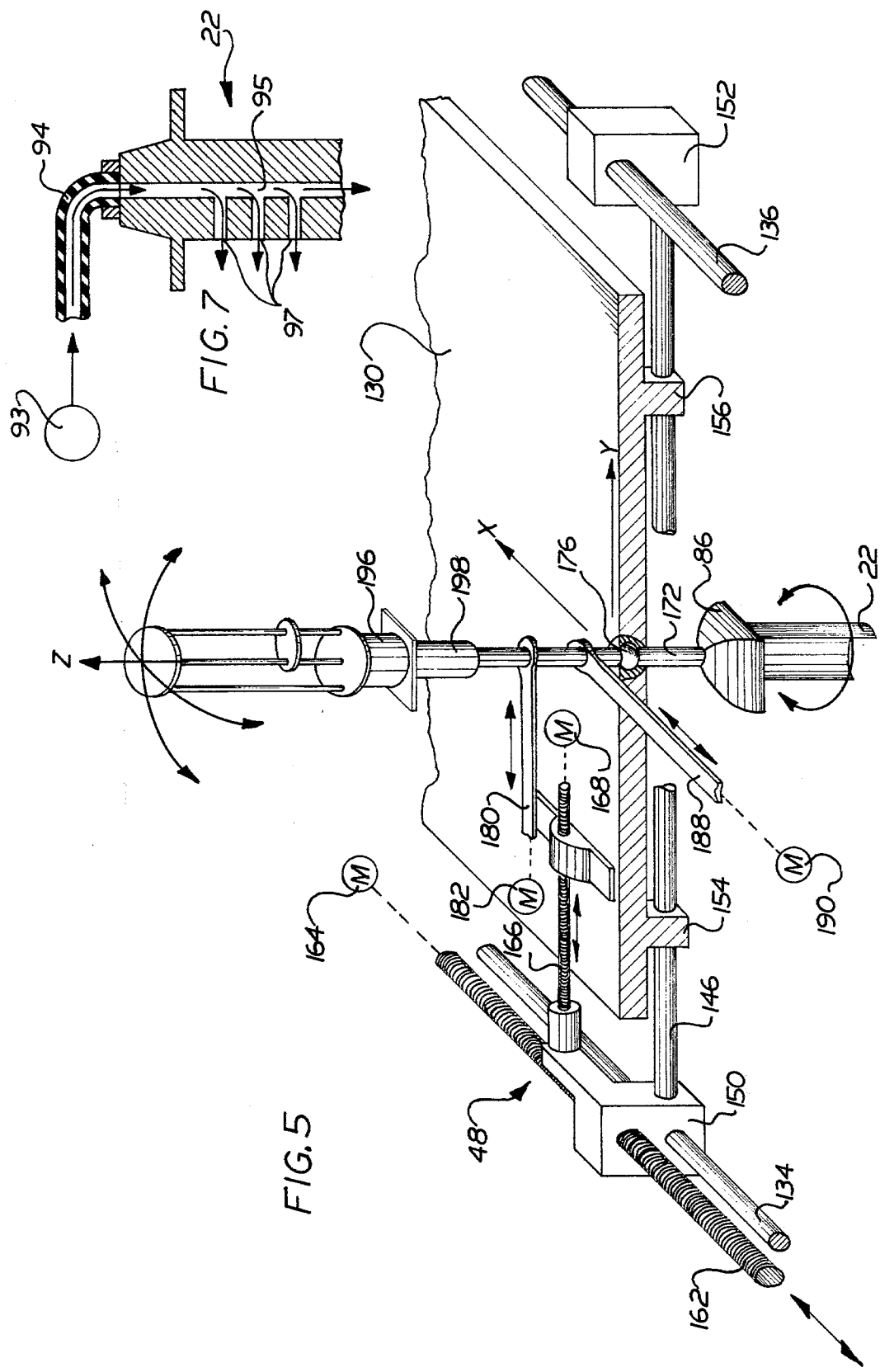

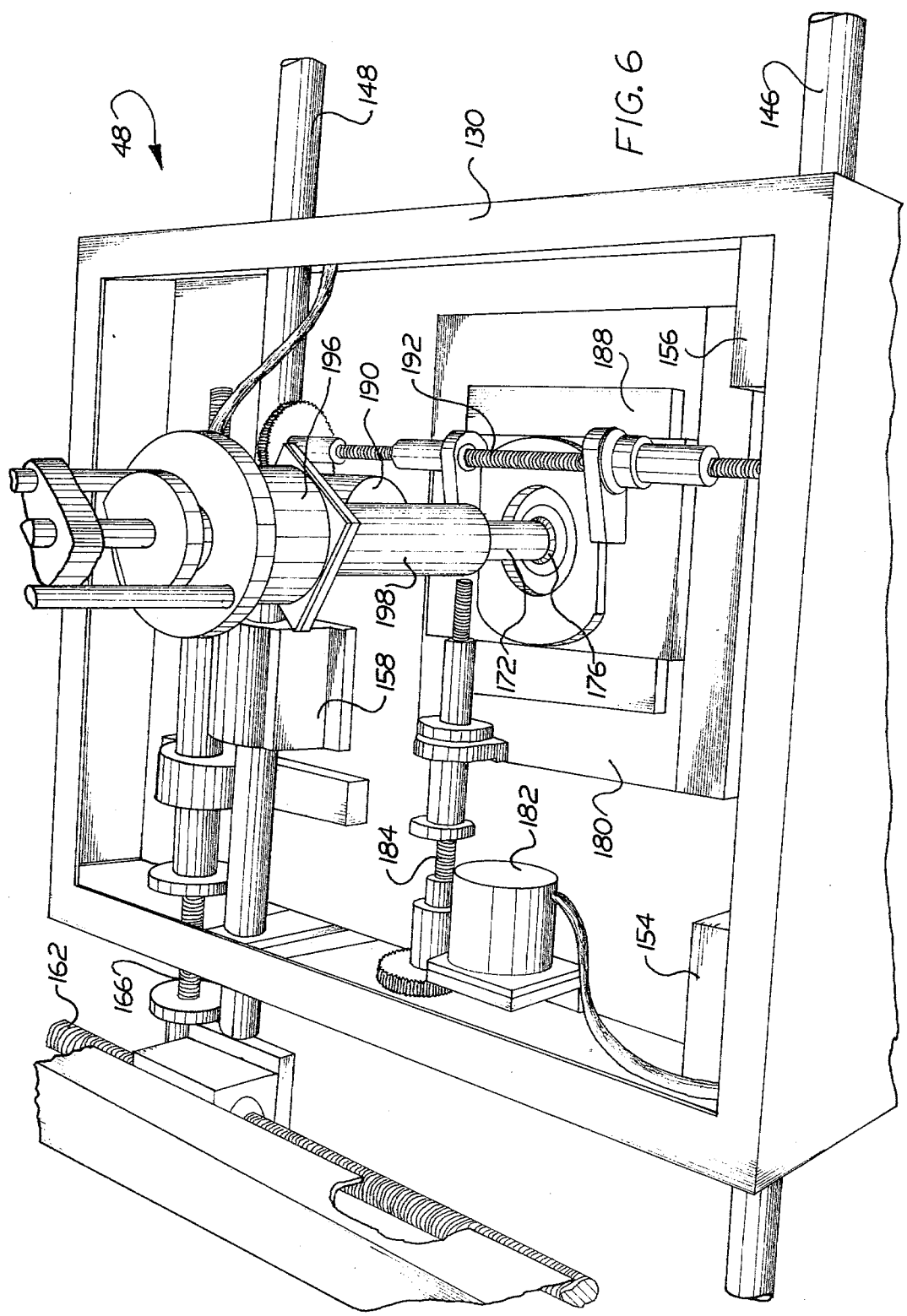

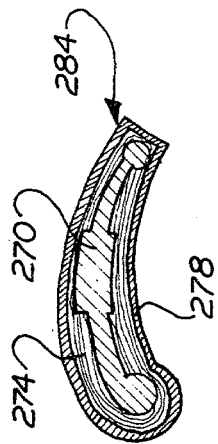
FIG. 14
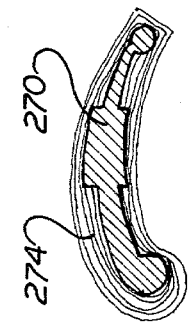
FIG. 13
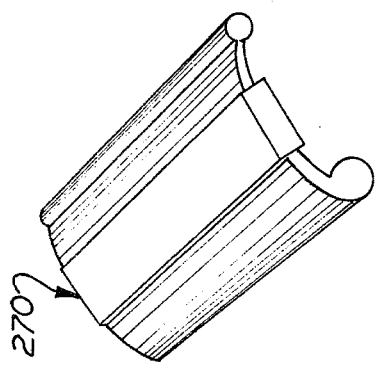
FIG. 12
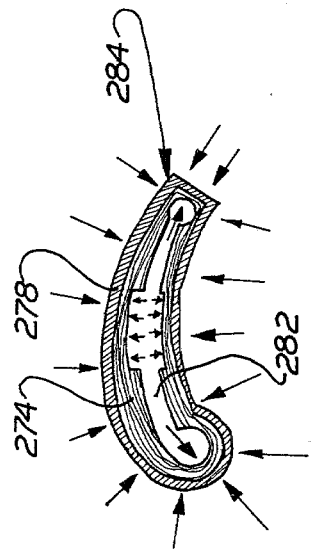
FIG. 16
FIG. 15

METHOD AND APPARATUS FOR USE IN MAKING AN OBJECT

BACKGROUND OF THE INVENTION

The invention described herein was made in the performance of work under NASA Contract NAS 3-20112 and is subject to the provisions of Section 305 of the National Aeronautics and Space Act of 1958 (72 Stat.435; 42 U.S.C. 2457).

The present invention relates to a new and improved method and apparatus for making an object. The method and apparatus can advantageously be utilized to effect the accurate application of a covering having either a uniform or nonuniform thickness to a workpiece, that is to any base material capable of receiving the covering.

There are many known prior art devices for applying a covering to a workpiece. Thus, U.S. Pat. No. 3,953,704 discloses the concept of applying a covering of metal to a workpiece which is a ceramic substrate. The metal covering is applied by a plasma spray gun and the workpiece can be positioned along any one of three axes by a drive apparatus. Although this patent contemplates that the workpiece will be moved along three axes, the patent does not contemplate that the workpiece will be rotated about any of the axes to vary the angular orientation of the workpiece relative to the plasma spray gun.

The concept of rotating a welding nozzle about an axis to apply a bead to the inside of a workpiece which is a pump casing, is disclosed in U.S. Pat. No. 3,627,973. The apparatus disclosed in this patent is utilized to repair the inside of the pump casing by depositing a plurality of beads of material along the inside of the casing. The welding nozzle is movable along X, Y, and Z axes. Although the welding nozzle cannot be rotated about the X and Z axes, the welding nozzle can be rotated about the Y axis. Other devices for applying coverings to workpieces are disclosed in U.S. Pat. No. 3,769,486 and 3,865,525.

The concept of applying a plasma spray coating of from 30 to 40 thousandths of an inch in thickness to a workpiece, that is, a turbine vane, is disclosed in U.S. Pat. No. 4,028,787. The well known process of rebuilding turbine vanes by manually applying a plasma spray covering can, at best, obtain a surface finish accuracy of plus or minus six mils (0.006 inches). The plasma spray build-up must be abraded in order to provide the desired surface measurements.

The application of thermal barrier coverings to airfoils has been attempted on an experimental basis using manually manipulated plasma spray guns. These experiments with the manual application of a plasma spray covering to an airfoil have been less then successful. This is due to the fact that it is a very slow process and the thickness of the plasma spray coating can, at best, be applied with an accuracy of plus or minus 6 mils (0.006 inches). In order to be acceptable for use in a turbine engine, a coating should be applied to the airfoil with an accuracy of at least plus or minus 1.5 mils (0.0015 inches).

The concept of applying coverings to airfoils are also disclosed in U.S. Pat. No. 3,068,556 and 1,755,321. These patents contemplate that the coverings will be more or less uniform in thickness. The concept of using plasma spray techniques to deposit a wear resisting covering of a nonuniform thickness to a workpiece is disclosed in U.S. Pat. No. 4,003,115. In addition, the concept of using electroslag welding procedures to apply metal from a plurality of electrodes in layers of different thicknesses to a workpiece is disclosed in U.S. Pat. No. 3,778,580.

The aforementioned prior art patents disclosing different methods of applying coverings to workpieces do not disclose how the thickness of the covering is to be measured. However, there are many known devices for measuring distance. Thus, U.S. Pat. No. 3,940,608 discloses an optical sensing apparatus which is utilized to determine the displacement of an object from a given position. This patent contemplates that the distance will be measured by measuring the intensity of the light reflected from the object and determining the location of that intensity on a curve which compares the intensity of the reflected light to the distance from the object.

The concept of measuring changes in the location of an object by detecting changes in the location of the focal point of a lens is disclosed in U.S. Pat. No. 3,016,464. However, this patent does not disclose the concept of using such a sensing apparatus in association with an apparatus which is utilized to control the application of a covering to a workpiece.

BRIEF SUMMARY OF THE PRESENT INVENTION

The present invention provides a new and improved method and apparatus for applying a covering of either uniform or nonuniform thickness to a workpiece. When a nonuniform covering is applied to a workpiece, the resultant product will have a configuration which is different than the configuration of the workpiece to which the covering was applied. The workpiece to which the covering is applied can have many different constructions and may be formed of many different materials so long as the workpiece is capable of receiving the covering.

In one specific utilization of the invention, a covering of a uniform thickness is accurately applied to an airfoil. In another specific utilization of the invention, an airfoil is formed on a workpiece or core which is subsequently removed from the airfoil. It should be understood that it is contemplated that the present invention could be utilized in association with many different types of objects other than airfoils.

An apparatus constructed in accordance with the present invention includes a spray gun which is utilized to direct a flow of one or more materials toward a workpiece, such as an airfoil. A sensor assembly is provided to determine the thickness of the covering applied to the workpiece. A control assembly is connected with the sensor assembly and the spray gun. The control assembly is effective to compare the thickness of the covering of material which is actually applied to the workpiece with a desired thickness and is effective to regulate the operation of the spray gun in such a manner as to effect the application to the workpiece of a covering having the desired thickness. Since adaptive controls are utilized, none of the articles are rejected.

Although it is contemplated that many different types of sensor assemblies could be utilized in association with the plasma spray gun to determine the thickness of the covering applied to the workpiece, an optical sensor assembly is advantageously utilized. The optical sensor assembly is utilized to detect when a surface area on either the workpiece or a covering is at the focal point of a lens. This is accomplished by sensing changes in the light reflected from the surface area with changes in the distance between the sensor assembly and the workpiece.

During changes in the distance between the workpiece and the sensor assembly in one direction, the light reflected from the workpiece back to a photosensor decreases as the distance between the sensor assembly and the surface area approaches a focal length distance. As this is occurring, the light reflected back to a light source increases. Once the focal length distance is reached between the surface area and the sensor assembly, a minimum amount of light is reflected back to the photosensor and a maximum amount of light is reflected back to the light source. Continued relative movement between the sensor assembly and the workpiece results in an increase in the amount of light reflected to the photosensor and a resulting decrease in the amount of light reflected back to the light source. Therefore, it is possible to detect when the surface area and sensor assembly are spaced apart by the focal distance by detecting when the amount of light reflected to the photosensor stops decreasing and starts increasing.

By utilizing the method and apparatus of the present invention, it is possible to control the operation of a plasma spray gun to apply a covering which will have a thickness which is within 1.5 mils (0.0015 inches) of a desired thickness. The accurate application of the covering to the workpiece is promoted by detecting the thickness of the covering at several different points on the workpiece and controlling the operation of the plasma spray gun as a function of differences between the desired covering thickness and the actual covering thickness as sensed at several points on the workpiece. A printer assembly provides a permanent record of the actual thickness of the covering at various points on the workpiece.

The application of a covering of the desired thickness to the workpiece is further promoted by applying the covering in layers formed of longitudinally extending strips. The central axes of the strips in one layer are offset from the central axes of the strip of a next adjacent layer.

When the covering is to be applied to a workpiece having a complex configuration, such as an airfoil, the accurate application of the covering is greatly promoted by utilizing an apparatus having six degrees of freedom of relative movement. Thus, an apparatus constructed in accordance with the present invention can effect relative movement between the airfoil and a spray gun along three different axes. In addition the apparatus can effect rotational movement between the airfoil and the spray gun about three axes. The speed of relative movement between the airfoil and spray gun can be varied to vary the thickness of the covering applied in each strip of material applied to the airfoil.

The airfoil is provided with a plurality of coverings. In one specific instance, a bond covering is applied to the airfoil and a thermal barrier covering is applied over the bond covering. A transition covering formed of a mixture of the bond and thermal covering materials is advantageously utilized between the bond and thermal barrier coverings to promote a strong interconnection between the bond and thermal barrier coverings.

Accordingly, one of the features of the present invention is to provide a new and improved method and apparatus for effecting the accurate application of a covering, which may have either a uniform or nonuniform thickness, to a workpiece which can be formed of any material capable of receiving the covering.

Another feature of this invention is to provide a new and improved method and apparatus for applying a covering of material to at least a portion of a workpiece which may be an airfoil and wherein a sensor is utilized to detect the thickness of the covering of material applied to the workpiece and a control assembly regulates the operation of a spray gun as a function of the difference between the detected thickness of the covering and the desired thickness of the covering.

Another aspect of this invention is to provide a new and improved apparatus for applying a covering to at least a portion of a workpiece, such as an airfoil, with a spray gun and wherein relative movement can occur between the workpiece and spray gun along each of three transversely extending axes and wherein relative rotation can occur between the workpiece and spray gun about each of three axes.

Another feature of this invention is to provide a method and apparatus to measure the thickness of a covering applied to a workpiece without engaging the covering with a solid object.

Another aspect of this invention is to provide a new and improved method of determining the location of a surface by detecting when the amount of light reflected back to a light source stops increasing and starts decreasing during relative movement between a lens and the surface.

Another feature of this invention is to provide a new and improved airfoil having a sprayed covering with a thickness which varies by an amount which is less than 0.003 of an inch.

Another feature of this invention is to provide a new and improved method of making an airfoil and wherein material is sprayed onto a base having a configuration which is different than the configuration of the airfoil to form a nonuniform covering having an exterior surface with a configuration which corresponds to the configuration of the airfoil.

Another feature of this invention is to provide a new and improved method and apparatus for accurately applying a covering to a workpiece, such as an airfoil, and wherein the workpiece is held by a single gripper assembly during both the application of the covering to the workpiece and during measurement of the thickness of the covering.

BRIEF DESCRIPTION OF THE DRAWINGS

The foregoing and other objects and features of the present invention will become more apparent upon a consideration of the following description taken in connection with the accompanying drawings wherein:

FIG. 3 is a pictorial illustration of the apparatus of FIG. 1;

FIG. 4 is an enlarged illustration of a portion of the apparatus of FIG. 3 and illustrating the relationship between the airfoil, a plasma spray gun for applying a coating of material to the airfoil, and a sensor assembly which is utilized to detect the thickness of a covering applied to the airfoil;

FIG. 5 is a schematic illustration depicting the manner in which relative movement occurs between the airfoil and the plasma spray gun of FIG. 4;

FIG. 6 is an enlarged pictorial illustration depicting the construction of a drive apparatus which effects relative movement between the airfoil and the plasma spray gun in the manner shown schematically in FIG. 5;

FIG. 7 (on sheet four of the drawings) is a schematic illustration of the manner in which cooling fluid flows through internal passages in an airfoil as the plasma spray gun applies heated material to the airfoil;

FIG. 12 is a pictorial illustration of a core or workpiece which is utilized as a base in the making of an airfoil;

FIG. 13 is a sectional view through the core after a plurality of layers of material have been applied to the core with the apparatus of FIGS. 1 and 3 to at least partially form the airfoil;

FIG. 14 is a sectional view, generally similar to FIG. 13, illustrating the relationship between a protective coating applied over the layers of FIG. 13 and the core;

FIG. 15 is a sectional view, generally similar to FIG. 14, illustrating the airfoil with the core removed; and FIG. 16 is a sectional view, generally similar to FIG. 15, schematically illustrating the manner in which pressure is applied against the airfoil to increase its density.

DESCRIPTION OF SPECIFIC PREFERRED EMBODIMENTS OF THE INVENTION

General Description of the Apparatus

Figure 1:
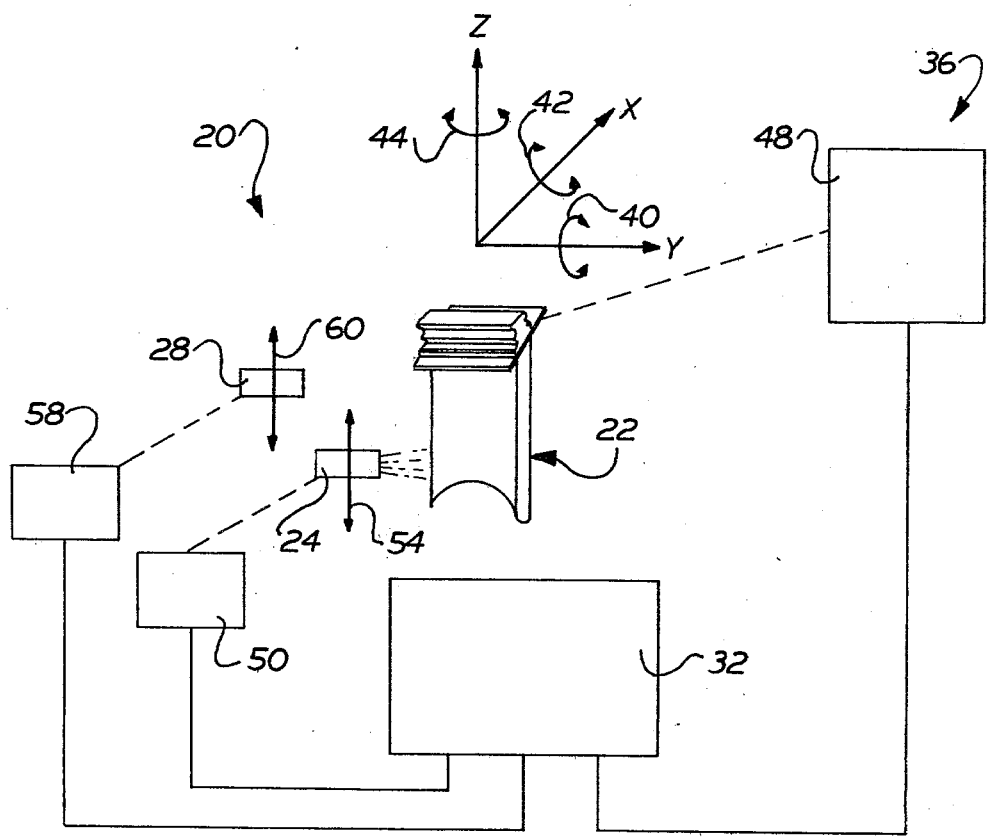
FIG. 1 is a schematic illustration of an apparatus which is constructed in accordance with the present invention and is utilized to apply a covering to at least a portion of a workpiece, which in FIG. 1 is an airfoil.

An apparatus 20 for use in applying a covering having a uniform or nonuniform thickness to a workpiece 22 is illustrated in FIGS. 1 and 3. The apparatus 20 includes a spray gun 24 which is used to apply the covering to the workpiece 22. A sensor assembly 28 is utilized to determine the thickness of the covering applied to the workpiece 22 by the spray gun 24. A control apparatus 32 is utilized to control the operation of the spray gun 24 to apply a covering of a desired thickness to the workpiece 22.

The control apparatus 32 cooperates with the sensor assembly 28 and spray gun 24 to effect an extremely accurate application of material on the workpiece 22. Although the accuracy with which the material has to be applied to the workpiece will vary with variations in the workpiece and the environment in which it is to be used, in one specific instance the thickness of the covering varied by less than plus or minus 1.5 mils (0.0015 inches) from a desired thickness. In order to accurately determine the thickness of the covering, the sensor assembly 28 is capable of repeatedly detecting the thickness of the covering with an error of less than 0.5 mils (0.0005 inches).

In order to obtain the accurate application of a covering to a workpiece having a complex configuration, a drive apparatus 36 is utilized to effect relative movement between the workpiece 22 and the spray gun 24 along each of three orthogonal axes which have been indicated as the X, Y, and Z axes in FIG. 1. In addition, the drive apparatus 36 is effective to rotate the workpiece about each of the three axes in the manner indicated schematically by the arcuate arrows 40, 42, and 44 in FIG. 1. By providing six degrees of freedom of relative movement between the workpiece and the spray gun 24, that is relative movement can occur between the spray gun 24 and workpiece 22 along each of three axes and relative rotational movement can occur around each of three axes, a workpiece 22 having a complex configuration can be accurately sprayed with a covering of material by the gun 24.

Although it is contemplated that the workpiece 22 could be moved along each of the three axes and rotated about each of the three axes, in the illustrated embodiment of the invention, the drive apparatus 36 is effective to move the workpiece along the X and Y axes and to move the spray gun 24 along the Z axis. Accordingly, the drive apparatus 36 includes a workpiece drive assembly 48 (FIG. 1) which is operable by the control apparatus 32 to move the workpiece 22 relative to the spray gun 24 along the X and/or Y axes and to rotate the workpiece around the X, Y, and/or Z axes.

A spray gun drive assembly 50 is provided to move the spray gun 24 along the Z axis. It should be noted that the Z axis has been considered as extending through the center of the workpiece and that the spray gun 24 is displaced to one side of the Z axis. Although the spray gun 24 is displaced at one side of the Z axis, it is moved along Z axis by the drive apparatus 50 in the manner illustrated schematically by the arrow 54 in FIG. 1. It should be understood that although in the illustrated embodiment of the invention it is preferred to effect rotational movement of the workpiece 22 relative to the spray gun 24 about the X, Y, and Z axes, the spray gun 24 could be rotated relative to the workpiece 22 in such a manner as to effect one or more of the rotational components of relative movement between the spray gun 24 and workpiece 22. In addition, the spray gun 24 could be moved along the X and Y axes if desired.

In addition to the workpiece drive assembly 48 and the spray gun drive assembly 50, a sensor drive assembly 58 is provided to effect relative movement between the sensor assembly 28 and the workpiece 22. In the present instance, the sensor assembly 28 is moved along only the Z axis by the drive assembly 58 in the manner indicated schematically by the arrow 60 in FIG. 1. However, the workpiece drive assembly 48 is operable to effect movement of the workpiece 22 relative to the sensor assembly 28 along the X and Y axes and to rotate the workpiece 22 about the X, Y, and Z axes. Thus, six degrees of freedom of relative movement are available between the workpiece 22 and the spray gun 24 and between the workpiece and the sensor assembly 28.

It is contemplated that the workpiece 22 could have many different constructions and could be formed of many different materials. The primary requisite for the workpiece 22 is only that it be able to receive and support a covering applied to it by the spray gun 24. In the present instance, the workpiece 22 is an airfoil (see FIG. 2) which is utilized in a turbine engine.

The spray gun 24 is of the electric arc plasma spray type which is capable of directing heat-softened particles entrained in a high velocity plasma stream toward the airfoil 22. The plasma spray gun 24 (FIG. 3) is of the multiport type which is supplied with powdered material of two different compositions. The plasma spray gun 24 is a 40 kw unit made by Plasmadyne, Inc., a division of Geotel, Inc. of Amityville, N.Y., U.S.A. and is of the same general type as the plasma spray guns illustrated in U.S. Pat. Nos. 3,914,573 and 2,961,335. Although a specific spray gun has been disclosed herein, it should be understood that the present invention contemplates that many different types of spray guns could be utilized if desired and that the invention is not to be limited to having the spray gun 24 be of any particular type unless so required by the appended claims.

A covering 64 (FIG. 2) is applied to a blade portion 68 of the airfoil 22. Thus the covering extends over the major side surfaces 66, longitudinally extending leading and trailing edges 70 and 72, the top surface of a platform at a root end portion 74, and a tip end portion 76 of the airfoil 22. If the trailing edge of the blade 68 is provided with cooling passages, the trailing edge is not covered to prevent blockage of the passages. The general construction of the airfoil 22 is well known and will not be further described herein in order to provide prolixity of description.

The covering 64 which is applied to the airfoil 22 by the spray gun 24 includes a bond coat or covering 80 which is applied directly against the surface of the airfoil 22. The bond covering 80 is also effective to prevent oxidation of the airfoil 22. A thermal barrier coating or covering 82 is applied over the bond covering 80. It is contemplated that a transition covering formed by a mixture of the materials used in the thermal barrier and bond coverings could be utilized between the two coverings to provide a strong interconnection capable of withstanding severe operating conditions.

Although it is contemplated that the covering 64 could have many different compositions, in one specific instance the bond covering 80 was a NiCrAlY covering which was 4 mils (0.004 inches) thick. The bond covering 80 was applied by moving the gun 24 at a uniform surface scan speed of approximately 16 inches per second. The bond covering 80 was applied in a plurality of passes of the spray gun 24 with a covering of approximately 2 mils (0.002 inches) thickness being applied on a first pass of the gun 24 and 1 mil (0.001 inches) being applied on each subsequent pass of the spray gun 24.

The thermal barrier covering 82 was formed of yttria stabilized zirconium oxide. The thermal barrier covering can be approximately 12 to 30 mils thick depending upon the requirements for the particular airfoil. The thermal barrier zirconium oxide covering 82 was applied in a number of passes of the gun 24. A covering of approximately 0.8 mils thickness was applied on each successive pass of the gun. However, it should be understood that the thickness of the covering applied on each pass of the gun 24 can be varied by varying the speed of movement of the gun relative to the airfoil or by varying the feed rate of material to the gun.

Figure 2:
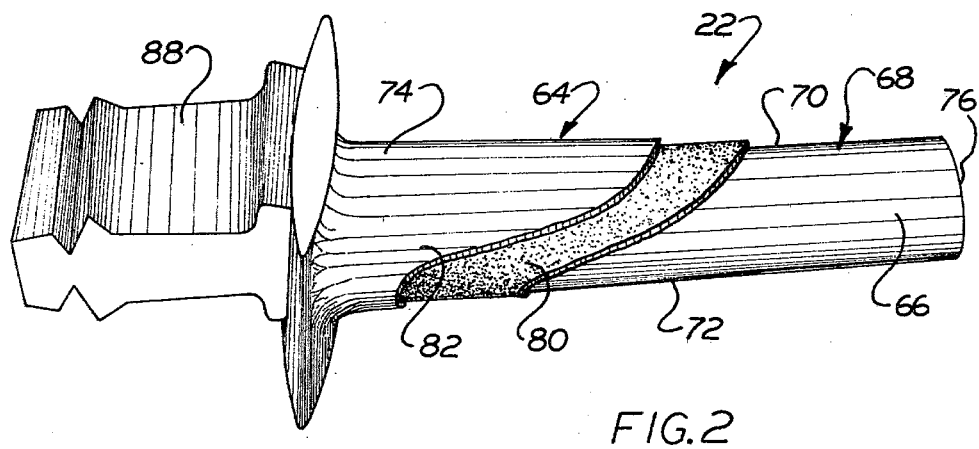
FIG. 2 is an enlarged illustration of the airfoil with a portion of a covering which was applied with the apparatus of FIG. 1, broken away.

Although only a bond covering 80 and thermal barrier covering 82 have been shown in FIG. 2, a transition covering is advantageously applied to the bond covering before the thermal barrier covering is applied. This transition covering is formed of a mixture of the materials in the bond and thermal barrier coverings. The transition covering promotes a strong connection between the bond and thermal barrier coverings even though they have different coefficients of thermal expansion. In the specific embodiment described above, the transition covering is formed by a mixture of yttria stabilized zirconia and NiCrAlY alloy.

The bond and thermal barrier coverings 80 and 82 each have a thickness which varies by less than 1.5 mils (0.0015 inches) from a desired thickness throughout the area of the coating overlying the blade 68. If a transition covering is utilized, it is applied with a similar degree of accuracy.

This high degree of accuracy in the application of the coating 64 to the airfoil 22 is necessitated by the fact that the airfoil is utilized in a turbine engine. During operation of the engine, the airfoil 22 is rotated at an extremely high speed so that any error in the coating 64 would result in relatively high centrifugal stresses being set up in the airfoil 22. In addition, it is necessary to have an accurately formed outer surface for the coating 64 due to the fact that high temperature gases flow past the outer surface of the coating at extremely high velocities. Of course, if a covering was being applied to a different type of workpiece, a lesser degree of accuracy might be acceptable.

It should be understood that although particular covering thicknesses, compositions and modes of application have been set forth herein to facilitate understanding of the invention, it is contemplated that other covering thicknesses and compositions could be utilized. It should also be understood that the invention is not, except when required by the appended claims, to be limited to a multilayered covering for an airfoil or to a covering having a particular degree of accuracy in regard to the thickness of the covering. This is because although the apparatus 20 is extremely well suited and can advantageously be utilized to provide thermal barrier coverings for airfoils, it is contemplated that the apparatus will be utilized to provide many different types of coverings on many different types of articles.

Method of Applying A Covering To An Airfoil

Although it is contemplated that the apparatus 20 will be utilized to apply coverings to many different articles, the method of applying the covering 64 to the airfoil 22 will be described to illustrate one specific method of operating the apparatus 20. Of course, the apparatus 20 could be constructed differently and operated in a different manner if the characteristics of the article being covered so require or allow.

When the multilayer covering 64 is to be applied to the airfoil 22 by the apparatus 20, the airfoil is mounted in a gripper assembly 86 (see FIGS. 3 and 4). The gripper assembly 86 engages the root or platform end 88 (see FIG. 2) of the airfoil 22 and is provided with a shield or barrier plate 92 (FIG. 4). The barrier plate 92 prevents excess spray from the gun 24 impinging directly against the clamp which holds the root end portion 88 of the airfoil. The barrier plate 92 also shields the root and edges of the platform. This tends to minimize thermal effects on the clamp and resulting inaccuracies in the positioning of the airfoil 22. In addition, a stream of a cooling fluid, in the present instance carbon dioxide gas, is directed against the airfoil 22 to cool the airfoil and further reduce thermal effects.

The directing of a stream of cooling fluid against the airfoil 22 is effective to minimize thermal effects. However when an airfoil having an internal passage is being sprayed, further cooling can be obtained by directing a flow of fluid through the passage in the airfoil. The manner in which this could be accomplished is illustrated schematically in FIG. 7. Thus, a flow of cooling fluid from a source 93 is conducted through a conduit 94 to a longitudinally extending internal passage 95 in the airfoil 22. The central passage 95 is connected with openings in the trailing edge of the airfoil by passages 97. It should be emphasized that the apparatus 20 operates satisfactorily to apply coverings to airfoils without utilizing additional coolant flow through internal passages in the airfoil. However, when the airfoil is constructed with internal passages, providing a flow of cooling fluid through these passages does serve to further alleviate thermal effects.

Once the airfoil has been mounted in the gripper assembly 86, the exact locations of a plurality of points on the outer surface of the airfoil 22 are determined by using the sensor assembly 28. The exact locations of the various points on the surface of the airfoil 22 are transmitted to the control assembly 32 (FIGS. 1 and 3) where they are stored for future reference. It should be noted that since the sensor assembly 28 is immediately adjacent to the spray gun 24, the position of various portions of the surface of the airfoil 22 can be accurately determined by the sensor assembly 28 while the airfoil 22 is held by the same gripper assembly 86 (FIG. 4) as is used to hold the airfoil during the application of the covering 64 to the airfoil by the spray gun 24.

Once the exact location of various points on the surface of the airfoil 22 have been determined, the control apparatus 32 (FIG. 1) effects movement of the workpiece drive assembly 48 to accurately position the airfoil 22 in front of the spray gun 24. The spray gun 24 is then activated. Powdered material for the bond covering 80 (FIG. 2) is entrained in a suitable gas and conducted in a known manner to the spray gun through a hose or conduit 96 (see FIG. 4). At this time electrical energy and cooling liquids are conducted to and from the spray gun 24 through hoses or conduits 98 and 100. In addition, inert gas such as argon is connected to the spray gun 24 through the hose or conduit 102.

The spray gun 24 is activated and an electric arc is produced. Gas fed under pressure through the conduit 102 is conducted through the arc. The gas is ionized and heated in the electric arc. The heated ionized gas is a body of plasma which flows toward a spray gun exit port 106. Powdered material from the conduit 96 is directed into the high-temperature accelerating stream of plasma where it is heated. The heated powder particles are entrained in the plasma stream and are directed by the spray gun 24 against the airfoil 22. When the bond covering 80 is being applied, the powdered material conducted through the conduit 96 and directed toward the workpiece is a NiCrAlY alloy.

As the plasma stream leaves the spray gun 24 and is directed toward the airfoil 22, a spray gun drive motor 110 (FIG. 4) is operated to drive a vertical screw 112 which extends parallel to the Z axis. This moves the spray gun upward at a uniform speed so that the plasma stream is effective to apply a generally vertically extending strip of material to the airfoil 22.

Assuming that the rate of flow of heated material from the gun 24 remains constant, the thickness of the covering applied over a surface area of the blade can be controlled by controlling the speed of movement of the gun. Thus, when a relatively thick strip is to be applied to the airfoil, the control assembly 32 effects operation of the drive motor 110 to move the spray gun at a relatively slow speed. When a relatively thin covering is to be applied, the control assembly 32 causes the motor 110 to operate at a higher speed.

When the spray gun 24 reaches the end of a vertical upward stroke, it directs the plasma stream above the airfoil 22. The control apparatus 32 is then effective to activate the workpiece drive assembly 48 to index the airfoil 22. This causes a next adjacent portion of the airfoil 22 to be aligned to receive material from the spray gun 24. The spray gun 24 is then moved downwardly to apply a next succeeding strip of material to the airfoil 22 adjacent to and overlapping the preceding strip. In one specific instance, the strips were approximately 12 mm wide and had central axes which were spaced 5 mm apart.

When the spray gun 24 reaches the end of a vertical downward stroke, it directs the plasma stream beneath the airfoil 22. The airfoil 22 is then indexed again to position it to receive the next succeeding strip. This next strip is adjacent to and overlaps the last strip. The next strip is applied to the airfoil 22 as the spray gun 24 is moved upwardly along the Z axis by operation of the motor 110 under the influence of the control apparatus 32.

The strips of material are applied in succession around the airfoil 22 by moving the spray gun 24 along the Z axis and by accurately positioning the airfoil relative to the spray gun before each stroke is undertaken. It should be noted that although the airfoil 22 has an extremely complex configuration, successive surface areas on the airfoil can be accurately positioned relative to the spray gun 24 by the drive assembly 48. This is because the drive assembly 48 can move the airfoil along the X and Y axes and can rotate the airfoil about the X, Y, and Z axes. The exact positions to which the airfoil is indexed on each of the work strokes of the spray gun 24 is determined by a program in the control assembly 32.

After the first layer of the bond coat covering 80 has been applied to the airfoil 22, the spray gun 24 is operated to apply a next succeeding layer over the first layer. The longitudinally extending strips of the next succeeding layer have central axes which may be offset from the central axes of the strips of the first layer. This is done because there tends to be a slightly greater accumulation of material at the center of the strip then at the edges of the strip. By offsetting the longitudinal axes of the strips of adjacent layers of material, variations in the thickness of the bond coating 80 are minimized. It should be noted that the control apparatus 32 can effect operation of the drive assembly 48 to cause a slight dithering or sidewise movement of the blade along the X axis during a vertical stroke of the spray gun 24 along the Z axis to thereby promote blending of the strips applied to the airfoil 22 during work strokes of the spray gun 24.

The accuracy with which the covering is applied to the airfoil is promoted by applying the covering in successive layers with the longitudinal axes of the strips in each layer offset relative to the longitudinal axes of the strips of the next adjacent layer. However, sufficient uniformity of covering thickness (plus or minus 1.5 mils) may be obtained without offsetting the longitudinal central axes of the strips. In addition, the total thickness of a covering can be applied by spraying a plurality of strips on top of each other and then indexing the blade and spraying a plurality of strips adjacent to the first group of strips. It is contemplated that the specific manner in which the strips are applied will be varied to suit the configuration of a particular workpiece to which they are being applied and the accuracy with which the covering must be applied to the workpiece.

When the spray gun 24 has been operated to apply a number of layers of bond covering 80 to the airfoil 22, the thickness of the bond covering 80 is measured. In accomplishing this, the airfoil 22 is moved along the X axis from a spray receiving position adjacent to the spray gun 24 to a position adjacent to the sensor assembly 28. The sensor assembly 28 is then operated to detect the thickness of the bond covering 80 which has been applied to the airfoil.

It is contemplated that when the first measurement is made the bond covering 80 may have a thickness which is less than the desired thickness at each of the locations where the sensor assembly 28 initially sensed the position of the airfoil surface. The control assembly 32 determines the difference between the desired thickness and the actual thickness of the bond covering 80 applied to the airfoil 22 by the operation of the spray gun 24. This thickness determination is made while the airfoil remains in the gripper assembly 86. If the airfoil 22 was removed from the gripper assembly 86, errors would, in all probability, be introduced when the airfoil was repositioned in the gripper assembly.

Once the control apparatus 32 has determined the extent to which the actual thickness of the initial portion of the covering 80 differs from the desired thickness of the bond covering, the airfoil 22 is moved back into alignment with the spray gun 24. The spray gun 24 is then operated in the manner previously explained to increase the thickness of the bond covering as and where required.

After the spray gun 24 has been operated to increase the thickness of the initial covering 80 by an amount which the control apparatus 32 determines is sufficient to result in the covering having a desired thickness, the sensor assembly 28 is again utilized to detect whether or not the actual thickness of the bond covering 80 is the desired thickness. If the control apparatus 32 determines that additional material should be applied to the covering 80 in order that it will have the requisite thickness, the airfoil 22 is again moved into alignment with the spray gun 24 and additional material is applied to the airfoil. When the covering 80 is completed, it has a thickness which differs from the desired thickness by less than plus or minus 1.5 mil (0.0015 inches). It should be noted that, due to the thinness of the bond coat, it is often possible to achieve the required thickness of plus or minus 1.5 mils in the first spray sequence.

After the bond covering 80 has been applied in the manner previously explained, a thermal barrier covering 82 is applied directly over the bond covering without removing the airfoil 22 from the gripper assembly 86. In the present instance, the thermal barrier covering 82 is formed of yttria stabilized zirconia. The thermal barrier covering has a thickness of between 12 and 30 mils depending upon the environment in which the airfoil 22 is to be utilized.

The spray gun 24 is used to apply the thermal barrier covering 82 to the airfoil 22 in the same manner in which the spray gun was used to apply the bond covering 80 to the airfoil. However, during the application of the thermal barrier covering 82, powdered yttria stabilized zirconia is conducted to the multiport spray gun 24 through the conduit 120 (see FIG. 4).

The spray gun 24 is then effective to direct a plasma spray of yttria-stabilized zirconia toward the airfoil 22 in the manner previously explained in connection with the bond covering 80. As the spray of yttria stabilized zirconia is directed toward the airfoil 22, the spray gun drive motor 110 is operated to cause the drive screw 112 to move the spray gun 24 along a vertical path. During rotation of the drive screw 112, movement of the spray gun 24 along a path extending parallel to the Z axis is guided by a pair of upstanding rods 124 and 126 (FIG. 4).

As the spray gun 24 is moved along the Z axis relative to the airfoil 22, strips of yttria stabilized zirconia are sequentially applied to the airfoil 22. These strips extend from the root end portion 74 of the airfoil to the tip end portion 76 of the airfoil. In order to obtain a thermal barrier covering 82 of a desired thickness, a plurality of layers of strips of material are sequentially applied to the airfoil 22. Any tendency to form longitudinally extending relatively thick areas in the thermal barrier covering 82 is minimized by offsetting the longitudinal axes of strips in adjacent layers of the thermal barrier covering or by judicious selection of strip overlaps.

When the thermal barrier covering 82 has been built up to a thickness which is somewhat less than the desired thickness, the workpiece drive assembly 48 (see FIG. 1) is operated to move the airfoil 22 (see FIG. 4) to a position adjacent to the sensor assembly 28. The sensor assembly 28 is utilized in conjunction with the control apparatus 32 (FIG. 1) to detect the actual thickness of the thermal barrier covering 82. It should be noted that the airfoil 22 remains in the gripper assembly 86 from the time that the location of various points on the airfoil are sensed by the sensor assembly 28 prior to initiation of the application of the bond covering 80 until the thermal barrier covering 82 is completed. This eliminates any possibility of errors which could result from connecting and disconnecting the airfoil 22 from the gripper assembly 86.

Once the control apparatus 32 has determined the amount by which the thickness of the thermal barrier covering 82 must be increased in order to provide a coating of a desired thickness, the spray gun 24 is again operated to increase the thickness of the thermal barrier coating 82. The sensor assembly 28 is operated to sense the thickness of the thermal barrier coating at a plurality of locations on the airfoil 22. If for some unforeseen reason the thermal barrier covering 82 should have different thicknesses at different locations on the airfoil 22, the control apparatus 32 is effective to cause the spray gun 24 to operate in such a manner as to eliminate the variations in the thickness of the thermal barrier covering 82.

Accordingly, if it was detected that the initial operation of the spray gun 24 caused the application of a relatively thick initial thermal barrier covering 82 to a portion of the airfoil and a somewhat thinner thermal barrier covering to another portion of the airfoil, the control apparatus 32 would effect operation of the spray gun to make a plurality of passes or scans along the airfoil in the area where the thermal barrier coating 82 is relatively thin and would make a fewer number of passes or scans along the portion of the airfoil 22 where the thermal barrier coating was relatively thick. The thickness of the covering applied in a portion of a strip can be varied by varying the speed of movement of the spray gun 24 as a strip is applied. By repetitively sensing the thickness of the thermal barrier covering 82 and controlling the operation of the spray gun 24 with the control apparatus 32 as a function of the sensed thickness of the thermal barrier covering at a plurality of locations on the airfoil 22, the thermal barrier covering 82 will have a thickness which varies by less than 3 mils (0.003 inches).

Although the thermal barrier covering 82 is applied directly over the bond covering 80 on the airfoil 22, it is contemplated that a transition covering may be utilized between the bond and thermal barrier coverings. When a transition covering is to be provided, the control assembly 32 is effective to cause the spray gun 24 to apply a mixture of the bond covering materials and the thermal barrier covering materials over the bond covering 80 before the thermal barrier covering 82 is applied. The thickness of the transition covering is measured with the sensor assembly 28 in the manner previously explained in connection with the bond and thermal barrier coverings.

When a transition covering of the desired thickness has been applied to the airfoil, the thermal barrier covering is applied over the transition covering. It should be noted that the airfoil 22 is continuously maintained in the gripper assembly 86 during application of the bond covering, measuring of the thickness of the bond covering, application of the transition covering, measuring of the thickness of the transition covering, application of the thermal barrier covering and measuring of the thickness of the thermal barrier covering.

Although the operation of the spray gun 24 has been described herein in connection with the application of a bond covering 80 and a thermal barrier covering 82 to a airfoil 22, it is contemplated that the method and apparatus of the present invention will be utilized to apply coverings over portions of many different types of workpieces. It is contemplated that the coverings applied to these workpieces will be formed of many different types of materials and that there may or may not be a plurality of coverings applied to the same workpiece by the spray gun. In addition, it is contemplated that spray guns other than the particular plasma spray gun disclosed herein will be utilized to apply different types of materials to the workpieces.

Workpiece Drive Assembly

The workpiece drive assembly 48 is illustrated schematically in FIG. 5. A specific embodiment of the workpiece drive assembly 48 is shown in FIG. 6.

The workpiece drive assembly 48 includes a carriage 130 which is supported for movement along both the X and Y axes (FIG. 5). Although they could have different orientations, the Y axis extends generally parallel to the path of flow of material from the spray gun 24. The X axis extends generally perpendicular to the path of flow of material from the spray gun 24.

Accordingly, the carriage 130 is supported for movement along the X axis by a pair of parallel guide bars 34 and 136 (see FIG. 5). The guide bars 134 and 136 are fixedly connected to a pair of parallel longitudinally extending upper frame members 138 and 140 (FIG. 3) of a framework 142.

The carriage 130 is supported for movement along the Y axis by a pair of parallel support rods 146 and 148 (see FIG. 6). The support rods 146 and 148 are connected with the guide bars 134 and 136 by four bearing blocks, only two of which are shown at 150 and 152 in FIG. 5. The carriage 130 is connected with the support bars 146 and 148 by suitable bearings 154 and 156 and 158 (FIG. 6).

Thus, the carriage 130 is supported for movement along the X axis by the parallel guide bars 134 and 136. The carriage 130 is supported for movement along the Y axis by the parallel guide bars 146 and 148. Of course, the guide bars 146 and 148 move along the X axis with the carriage 130.

In order to effect movement of the carriage 130 along the X axis and the guide bars 134 and 136, a drive screw 162 is rotated by a reversible electric motor 164. It should be noted that the drive screw 162 extends parallel to the X axis and the guide bars 134 and 136. The drive screw 162 is connected with the bearing block 150 by a suitable ball nut or internally threaded drive element.

Similarly, the carriage 130 is moved along the Y axis and the parallel guide bars 146 and 148 by a drive screw 166. The drive screw 166 is rotated by a reversible drive motor 168 (FIG. 5).

In order to enable the airfoil 22 to be rotated about the mutually perpendicular X, Y, and Z axes, the airfoil engaging gripper assembly 86 is connected with a lower end portion of a longitudinally extending support member 172 (FIG. 5). The support member is pivotally connected with the carriage 130 at a universal joint 176. The universal joint 176 connects the support member 172 with the carriage 130 so as to allow the gripper assembly 86 freedom of sidewise movement in every direction within certain defined limits.

Accordingly, the universal joint 176 allows the support member 172 to rotate about its own longitudinally extending central axis to provide for rotational movement of the gripper assembly 86 and workpiece about the Z axis. The pivot joint 176 also enables the support member 172 to be pivoted about a point which is coincident with the center of the universal joint in the manner that the support member 172 moves in a conically shaped envelope and the gripper assembly 86 moves through a circle relative to the carriage 130. This enables the airfoil 22 to be pivoted about both the X axis and the Y axis.

To effect pivotal movement of the airfoil 22 about the X axis, a slide member 180 (see FIGS. 5 and 6) is movable under the influence of a reversible drive motor 182 (FIG. 6) and a drive screw 184. Upon operation of the drive motor 182, the drive screw 184 effects movement of the slide member 180 along a path which extends parallel to the Y axis. This movement of the slide member 180 is effective to pivot the support member 172 about the X axis at the universal joint 176.

The support member 172 is pivoted about the Y axis by movement of a second slide member 188 under the influence of a reversible electric drive motor 190 (see FIG. 6) and a drive screw 192. Upon operation of the reversible drive motor 190, the drive screw 192 moves the slide 188 along a path which extends parallel to the X axis and perpendicular to the Y axis. This effects pivotal movement of the support member 172 about the Y axis at the universal joint 176.

In order to effect rotational movement of the airfoil 22 about the Z axis which is perpendicular to the X and Y axes, a drive motor 196 is operable through a speed reduction assembly 198 to rotate the support member 172 about its central axis. It should be understood that although operation of the motor 182 effects pivotal movement of the workpiece about the X axis and that operation of the motor 190 effects pivotal movement of the workpiece about the Y axis, both motors could be simultaneously operated to effect simultaneous pivotal movement of the airfoil 22 about the pivot joint 176 to any desired position relative to the spray gun 24 and sensor assembly 28. Simultaneously therewith the motor 196 could be energized to rotate the airfoil 22 about the Z axis. It is also contemplated that simultaneously with pivotal movement of the airfoil 22 about the X, Y, and Z axes, the drive motors 164 and 168 could be energized to move the airfoil 22 along the X and Y axes.

It is believed that it will be apparent that the workpiece drive assembly 48 provides for five degrees of freedom of relative movement of the workpiece 22 relative to the spray gun 24 and sensor assembly 28. Thus, the workpiece 22 can be moved along the X and Y axes and can be pivoted about the X, Y, and Z axes by the drive assembly 48. The sixth degree of freedom of relative movement between the workpiece and the spray gun 24 and sensor assembly 28 is achieved by the spray gun drive assembly 50 and the sensor drive assembly 58.

The spray gun drive assembly 50 includes the motor 110 (FIG. 4) which rotates the drive screw 112 through a pair of gears 199 and 200. Upon operation of the reversible electric drive motor 110, the spray gun 24 is moved along the vertical guide bars 124 and 126 which extend parallel to the Z axis.

The sensor assembly 28 is moved by the drive assembly 58 in much the same manner as in which the spray gun 24 is moved by the drive assembly 50. Thus, the drive assembly 58 includes a reversible electric motor 205 (FIG. 4) which is connected by a pair of gears 206 and 207 with a vertical drive screw 208. The drive screw 208 extends parallel to the Z axis and to a pair of upright guide members 209 and 211. Thus, upon operation of the reversible electric drive motor 205 the sensor assembly 28 is moved along the Z axis by the drive screw 208.

Although a specific workpiece drive assembly 48, spray gun drive assembly 50, and sensor drive assembly 58 has been described herein, it is contemplated that drive assemblies having different constructions could be utilized to obtain relative movement between a workpiece and the spray gun 24 and sensor assembly 28 along the X, Y, and Z axes and to obtain relative rotational movement therebetween about the X, Y, and Z axes. For example, it is contemplated that the spray gun 24 and sensor assembly 28 could be stationary. The workpiece drive assembly 48 would then be effective to move the workpiece along all three axes and to rotate the workpiece about all three axes. Similarly, the workpiece could be stationary and the spray gun 24 and sensor assembly 58 could be moved along all three axes and rotated about all three axes. However, the combination of the workpiece drive assembly 48, spray gun drive assembly 50 and sensor drive assembly 58 is believed to be a particularly advantageous way to obtain the desired movement between the workpiece, spray gun and sensor assembly.

Sensor Assembly

The sensor assembly 28 is utilized in determining the thickness of the covering applied to a workpiece, such as the airfoil 22. The sensor assembly 28 utilizes electrical energy to detect the thickness of a covering without engaging the covering with a solid object.

Figure 8:
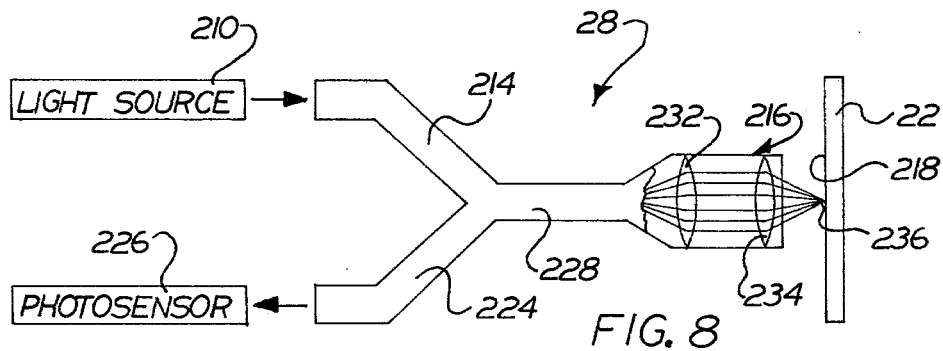
FIG. 8 is a schematic illustration depicting the construction of the sensor assembly of FIG. 4.

The sensor assembly 28 includes an electric light 210 which is a noncoherent light source (FIG. 8). Light from the lamp 210 is directed into a fiber optic bundle 214. The light from the fiber optic bundle 214 is transmitted through a lens assembly or optical extender 216 against a surface 218 of the airfoil 22. At least a portion of the light is reflected back from the surface 218 of the airfoil 22 to a fiber optic bundle 224 which leads to a photosensor 226.

The two fiber optic bundles 214 and 224 (FIG. 8) are randomly mixed in a main fiber optic bundle 228. Therefore, a portion of the light which is reflected from the surface 218 is directed back to the light source 210 through the fiber optic bundle 214 while the remainder of the light is directed to the photosensor 226 through the fiber optic bundle 224.

The lens assembly 216 includes a collimating lens 232 and a condensing lens 234. The condensing lens 234 is effective to direct the light from the light source toward a focal point which has been indicated at 236 in FIG. 8. The construction of the sensor assembly 28 is the same as is disclosed in U.S. Pat. No. 3,940,608 and is commercially available from MTI Instruments, Latham, N.Y. as a model KD-100 Fotonic Sensor and has a 2.2 millimeter diameter probe.

The sensor assembly 28 provides a clear indication of when a surface area on an object is spaced apart from the condensing lens 234 by a distance which is equal to the focal length of the lens. When the surface area of the airfoil 22 is at the focal point, as shown in FIG. 8, the amount of light which is reflected back to the light source 210 is maximized and the amount of light which is reflected to the sensor tends to be minimized. This is because the light rays reflected from the surface of the workpiece 22 through the condensing lens 234 and collimating lens 232 are directed back to the same fiber optic conduits from which they originated, that is back to the fiber optic conduits in the bundle 228 leading to the bundle 214. The manner in which this occurs has been shown graphically in FIG. 9.

Figure 9:
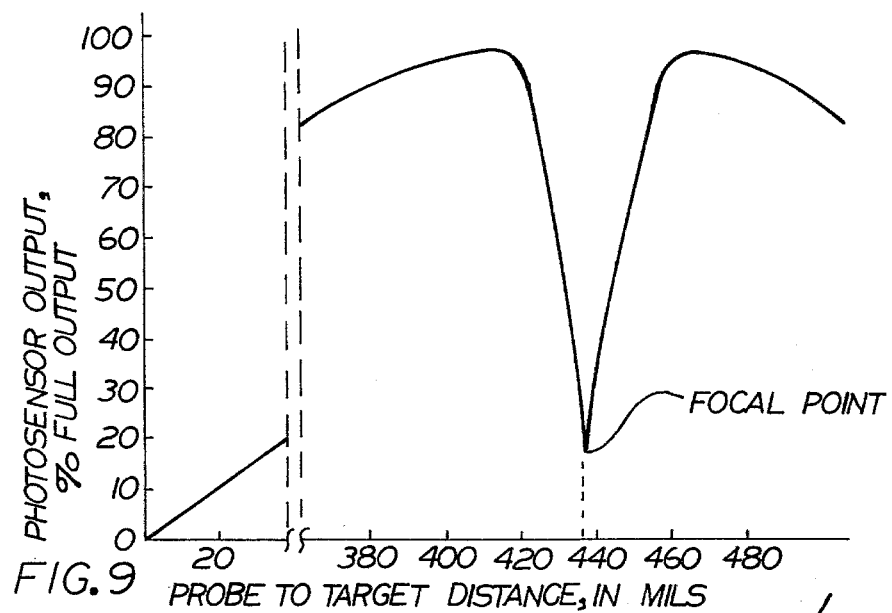
FIG. 9 is a graph depicting how the output from a photosensor of the sensor assembly of FIG. 8 varies with variations in the distance between the sensor assembly and a surface area from which light is reflected.

When the probe is against the workpiece, that is when the probe to target distance is zero mils, none of the light is reflected back to the photosensor 226 (FIG. 9). As the distance from the collimating lens 234 and the surface area of the airfoil 22 increases, the light reflected back to the photosensor 226 increases in a reasonably linear manner until a distance approaching to the focal distance is approached. The light reflected back to the photosensor 226 then begins to decrease.

For a lens assembly having the characteristics indicated by the graph in FIG. 9, the light reflected back to the photosensor begins to decrease when the lens 234 is spaced approximately 420 mils from the surface 218 of the airfoil 22. This sharp decrease continues until the focal point distance is reached at approximately 433 mils. As the distance increases from the focal point distance, the amount of light reflected from the photosensor 226 sharply increases again until the lens 234 is located about 460 mils from the surface of the workpiece. The light reflected back to the photosensor then decreases in a reasonably linear manner as the distance increases.

It should be understood that the relationship between the amount of light reflected to the light source 210 from the surface 218 varies in a manner which is substantially inverse to the manner in which the light reflected to the photosensor 226 varies with movement of the sensor assembly 28. Thus, when the sensor assembly 28 is spaced from the surface 218 by a distance equal to the focal distance of the lens 234, the amount of light reflected to the photosensor 226 tends to be minimized. At this time, the amount of light reflected to the light source 210 is maximized. As the distance between the lens 234 and the surface 218 changes to either side of the focal point distance, that is becomes either greater or lesser than 433 mils, the amount of light reflected to the light source 210 decreases as the amount of light reflected to the photosensor 226 increases in the manner shown in FIG. 9.

In effecting measurement of the covering applied to the airfoil 22, the uncoated airfoil is moved by the workpiece drive assembly 48 relative to the sensor assembly 28 until the surface of the airfoil is at the focal point, that is until the surface of the workpiece is spaced apart from the lens 234 by the focal distance of 433 mils. The position of the airfoil 22 at this time is stored in the control apparatus 32. This original positioning of the airfoil 22 provides a reference position from which subsequent measurements are determined.

When a substantial portion of a covering, such as the bond coat covering 80, has been applied to the airfoil 22 in the manner previously explained, the thickness of this initial covering is measured without engaging the covering. To this end, the workpiece drive assembly 48 is operated under the influence of the control assembly 32 to position the outer surface area of the initial portion of the covering at the focal point of the lens 234. When the surface area of the covering is at the focal point of the lens 234, that is when the surface area of the covering is 433 mils from the lens 234, the position of the airfoil 22 will be offset from its original or reference position by a distance equal to the thickness of the covering.

The control apparatus 32 can determine the actual thickness of the initial portion of the covering applied to the airfoil 22 by subtracting the position of the airfoil when the outer surface area of the covering is at the focal point of the lens 234 from the previously stored reference position. The thickness of the initial portion of the covering is then compared with the desired thickness of the covering to determine the amount by which the thickness of the initial portion of the covering would be increased in order to have a covering of the desired thickness. The control apparatus 32 then effects operation of the spray gun 24 to increase the thickness of the covering until it has the desired thickness. In this manner, the thickness of the bond coat covering 80 can be controlled to within plus or minus 1.5 mils (0.0015 inches) of a desired thickness.

Once the bond coating covering 80 has been applied to the airfoil, the thermal barrier coat covering 82 is applied over the bond coat covering. In determining the thickness of the thermal barrier covering 82, the initial reference position of the airfoil is utilized. The combined thickness of the bond coat covering 80 and the portion of the thermal barrier coat covering 82 which has been applied to the airfoil 22 is measured. This combined thickness is compared with a desired combined thickness for both coverings to determine the amount by which the thickness of the thermal barrier covering 82 must be increased. The thickness of the thermal barrier covering can also be controlled to within plus or minus 1.5 mils (0.0015 inches).

Figure 10:
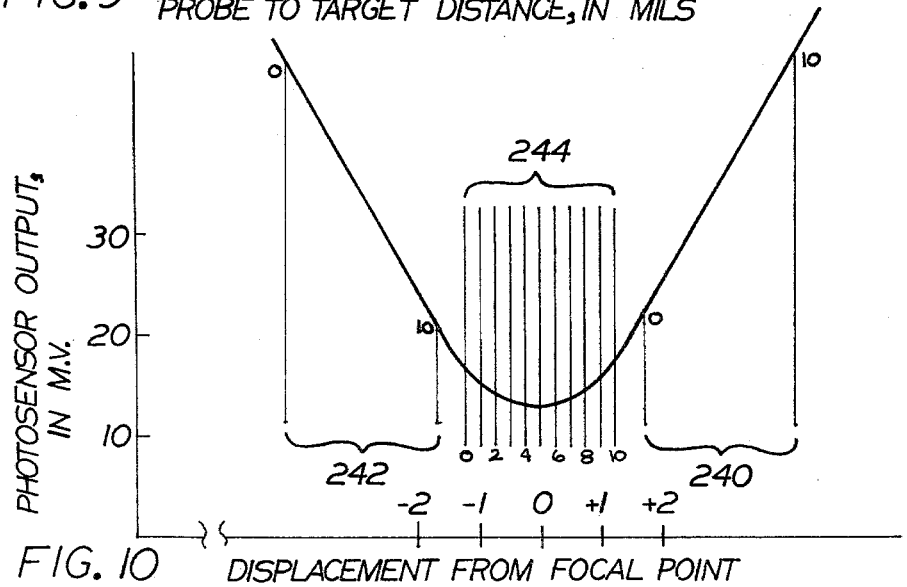
FIG. 10 is an enlarged graphic illustration of a portion of the curve of FIG. 9 and illustrating the relationship between the curve and readings which are taken to detect when the sensor assembly and a surface area from which light is reflected are spaced apart by a distance equal to the focal length of a lens.

The manner in which the focal point for the lens 234 is detected has been illustrated graphically in FIG. 10.

A set of ten memory locations is set up in the control apparatus 32 to constitute a first-in-first-out (FIFO) memory. After the airfoil 22 has been moved slightly closer to the sensor assembly 28 then the focal distance, the airfoil is moved away from the sensor assembly 28 in 0.0002 inch increments.

On the first step the voltage is read and entered into the first memory location in the first-in-first-out memory. On each successive step of the workpiece relative to the sensor, a new voltage reading is entered into the first memory location and all previous measurements are moved back by one memory location. A reading which has reached the last memory location is lost on the next step. Therefore, the memory always contains the last ten voltage readings and their corresponding probe coordinate steps.

When the first reading exceeds the last by a specified voltage, the value representing the focal point is assumed to have been detected and the coordinate of the sixth memory location is taken as the valley position. The program in the control apparatus 32 is set up to detect the negative slope preceding the valley and the positive slope following the valley by looking for appropriate differences between the first and last reading to the FIFO memory. Parameters that can be varied automatically if searching for the valleys are the voltage differences to define the slopes and the valley and the position in which the valley detect routine starts.

The manner in which the readings in the FIFO memory relate to a curve of photosensor output voltage has been illustrated schematically in FIG. 10. If it is assumed that the sensor assembly 28 is being moved away from the workpiece 22, that is toward the left as viewed in FIG. 8, the initial data entered into the FIFO memory could be considered as being relative to the photosensor output voltage curve in the manner illustrated schematically at 242 in FIG. 10. It should be noted that at the position indicated at 242 in FIG. 10 the tenth reading, that is the reading being taken, is substantially less than the zero reading, that is the reading stored in the tenth memory location of the FIFO memory. After the sensor assembly 28 has been moved away from the workpiece through the focal point, the readings stored in the FIFO memory locations could be considered as being relative to the photosensor output voltage curve in the manner illustrated schematically at 240 in FIG. 10. Thus at this time the tenth reading, that is the reading being taken, is substantially larger than the zero reading, that is the reading stored in the tenth memory location of the FIFO memory. Therefore, it can be readily determined that in moving the sensor assembly 28 from the position indicated at 242 in FIG. 10 to the position indicated at 240 in FIG. 10 the bottom of the valley or focal point position was passed.

In proceeding from the position illustrated schematically at 242 in FIG. 10 to the position illustrated at 240 in FIG. 10 the tenth reading, that is the reading being taken, will be less than the first or zero reading until the position indicated schematically at 244 is reached. In moving from the position illustrated at 242 to the position illustrated schematically at 244, the sensor assembly moves through the position in which the focal point of the lens 234 is on the surface of the workpiece. It should be noted that after the sensor assembly 28 moves through the focal point position, the successive voltage readings, that is the tenth reading being taken, will stop decreasing and start increasing.

When the sensor assembly 28 has moved through the focal point position to the position indicated schematically at 244 in FIG. 10, the voltage reading being taken, that is the tenth reading, will be approximately equal to but slightly less than the voltage reading stored in the tenth memory location. On the next successive incremental step of relative movement between the sensor assembly and the workpiece, the voltage reading being taken, that is the tenth reading, will exceed the voltage reading stored in the tenth memory location. This indicates that the bottom of the valley or focal point is disposed at a location between the location where the tenth voltage reading is being taken and the location where the zero voltage reading was previously taken. Since the readings will have shifted slightly to the right of the center of the bottom of the valley, the reading stored in the sixth FIFO memory location is assumed to have been made at the focal point position. Of course, the readings in each of the FIFO memory locations could be compared in order to determine which reading was the lowest to more accurately determine the focal point position.

It should be understood that in the illustrated embodiment of the invention the relative movement between the sensor assembly 28 and workpiece 22 is obtained by moving the workpiece relative to the sensor assembly with the drive apparatus 36. However, the sensor assembly could be moved relative to the workpiece in the manner assumed above in connection with FIG. 10. It should be understood that although the sensor assembly 28 has been described herein in connection with a method of applying a covering to a workpiece, it is contemplated that the sensor assembly could be used in association with a FIFO memory to locate any surface. For example, the sensor assembly could be utilized in association with an operation in which material is removed from a workpiece.

Another feature of the program is that the number of measurements taken in each step can be one or any multiple of two up to one hundred and twenty-eight. The value entered into the FIFO memory is then the average of the readings minimizing random noise effects. The number of memory locations in the FIFO can be varied up to any desired number. This process of detecting the focal point of the lens 234 shows a measurement repeatability with an error of less than plus or minus 0.5 mils (0.0005 inches).

In the embodiment of the invention described herein the airfoil or workpiece 22 has been moved relative to the sensor assembly 28 to detect when a surface on the workpiece is spaced a predetermined distance, that is the focal distance, from the sensor assembly. It is contemplated that the sensor assembly could be moved relative to the workpiece or airfoil 22 if desired. Although for safety reasons it is preferred to approach the focal distance from a point which is closer to the workpiece than the focal distance, that is by increasing the distance between the sensor assembly 28 and the workpiece or airfoil 22, it is contemplated that the focal point could be detected by decreasing the distance between the workpiece or airfoil 22 and the sensor assembly 28.

It is also contemplated that other types of sensor assemblies could be utilized if desired. For example, a sensor assembly using a coherent light source (laser gauge), or a capacitive sensor could be utilized if desired. It is believed that the accuracy with which measurements are made will be promoted with any known type of sensor by maintaining the workpiece or airfoil 22 in the clamp assembly 86 during both the application of a covering to the airfoil and measurement of the covering.

Control Apparatus

Figure 11:
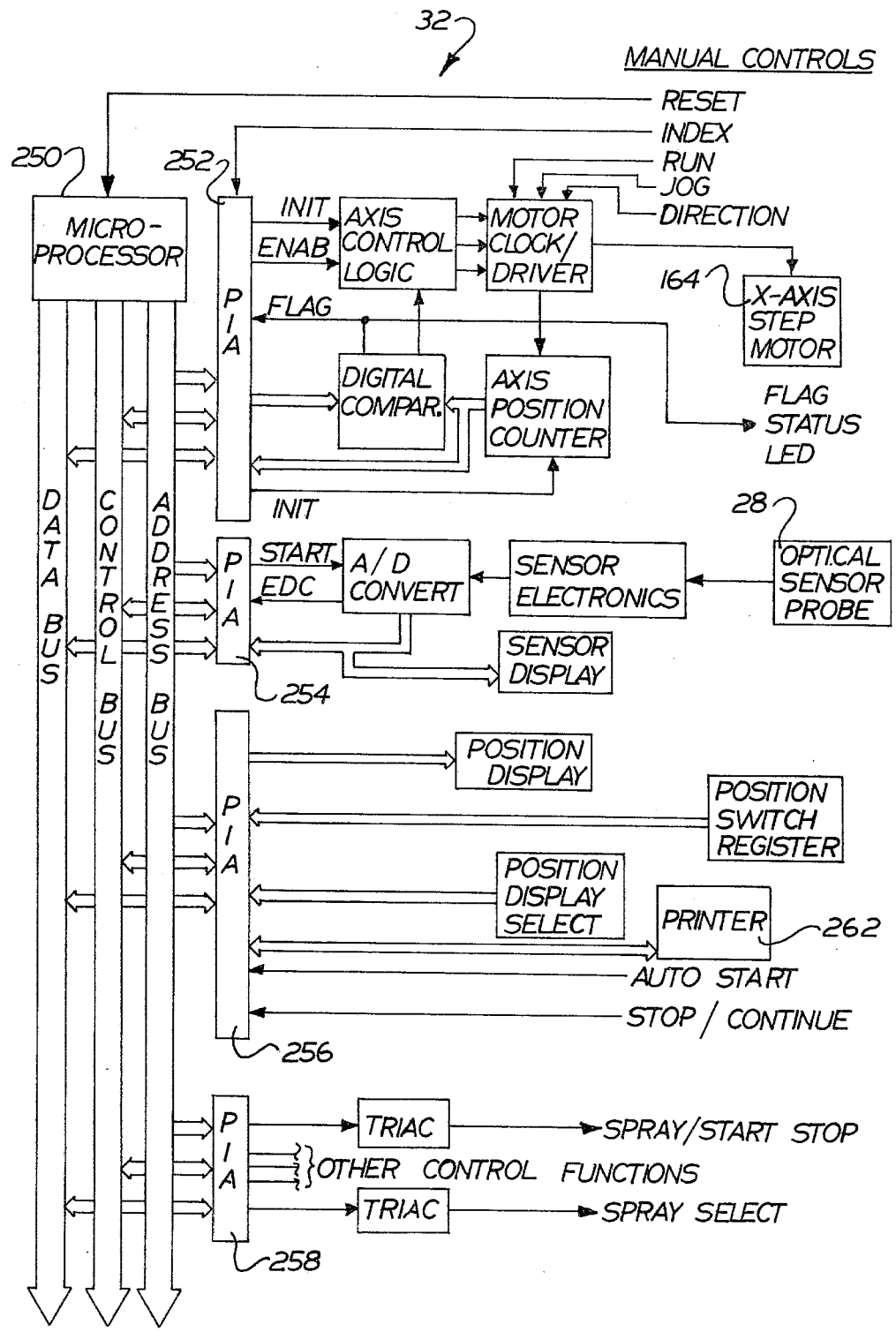
FIG. 11 is a schematic illustration of control apparatus used to control the operation of the plasma spray gun and sensor assembly of FIG. 4 and the drive apparatus of FIG. 6.

It is contemplated that many different types of known control systems could be utilized to control the operation of the workpiece drive assembly 48, the spray gun drive assembly 50, and the sensor drive assembly 58 to determine when the desired coating thickness has been obtained. However, in the illustrated embodiment of the invention, the control apparatus includes a microprocessor 250 (see FIG. 11) having peripheral interface adaptors 252, 254, 256, and 258 connected with the various drive motors, the optical sensor assembly, display outputs and manual control inputs, and the spray gun 24. Although the control circuitry connected with the X axis drive motor 164 has been shown in FIG. 11, it should be understood that similar control circuitry is connected with the spray gun and sensor drive motors 110 and 205 and with the other drive motors in the workpiece drive assembly 48, that is with the drive motors 168, 182, 190, and 196. Although the microprocessor 250 could have many different constructions, in one specific instance the microprocessor 250 was a type M 6800 microprocessor from Motorola Communications & Electronics, Inc. of Phoenix, Ariz.

In order to simplify the control circuitry, zero reference stops are utilized with all of the various drive motors, including the X axis drive motor 164. Provision of zero reference stops allowed position encoders to be eliminated. Accordingly, a reference register was provided for each motor in association with a digital comparator and a up/down counter.

For the purpose of making measurements, the optical sensor 28 was connected with an analog-to-digital convertor which was sampled by the microprocessor control system. The memory locations which constituted the first-in-first-out memory unit were also provided in the microprocessor.

In accordance with a feature of the present invention, a printer 262 (see FIG. 11) is provided in the control apparatus 32 to provide a printed record of the thickness of the covering applied to the airfoil. Thus, the sensor assembly 28 is utilized to detect the thickness of the covering applied to the airfoil 22 at a plurality of points on the airfoil. The printer 262 is utilized to record the thickness of the bond coat covering 80 and the thermal barrier coat covering 82 at each of a plurality of points on the airfoil 22. If a transition covering is utilized between the bond and thermal barrier coverings, the printer 262 would also record the thickness of the transition covering at each of a plurality of points on the airfoil.

In accordance with another feature of the invention, the control assembly 32 is effective to compensate for any variations which may occur during the application of the various coverings to the airfoil 22. This is because the sensor assembly 28 is utilized during the operation of the apparatus 20 to detect any deviations which may occur in the thickness of the covering. The control assembly 32 is effective to regulate operation of the spray gun 24 to compensate for any deviation in the thickness of the covering. During normal operation of the apparatus 20 this results in zero defects.

Method of Making An Airfoil

In the foregoing description, the apparatus 20 has been described in connection with the application of bond covering 80 and a thermal barrier covering 82 of uniform thicknesses to an airfoil. However, it is contemplated that the apparatus 20 will be utilized to apply nonuniform coverings with the resulting construction of a three dimensional object having a configuration which has very little resemblance to the configuration of the workpiece upon which the nonuniform covering is deposited. In FIGS. 12 through 16 an example of an application of such a nonuniform covering to fabricate an airfoil is disclosed. However, it should be emphasized that a nonuniform covering could be applied to any base capable of receiving the covering in order to provide for the build-up of material in such a manner as to form an object having any desired configuration.

In fabricating an airfoil in accordance with the method illustrated in FIGS. 12 through 16, a core 270 is provided. Although the core 270 does have a configuration which slightly resembles the configuration of an airfoil, it is contemplated that the core 270 could have any desired configuration. In the present instance the configuration of the core 270 was selected in order to provide internal passages of a desired configuration within the airfoil.

The core 270 is covered with a plurality of nonuniform layers, which have been indicated at 274 in FIG. 13, to form the basic configuration of an airfoil. It should be noted that the layers 274 were applied with the spray gun 24 by making more scans or passes across areas where the material is relatively thick than across areas where the material is relatively thin. Reference locations corresponding to the location of many different points on the surface of the core 270 were stored in the microcprocessor before the nonuniform covering 274 was applied.

By detecting the shifts in the position of the core when the outer surface areas of the nonuniform covering 274 overlying the various reference points were at the focal point of the lens 234 (FIG. 8), it was possible to determine the thickness of the nonuniform coating 274 at many different points. By controlling the operation of the spray gun 24 in the manner previously explained, it is possible to accurately build up a nonuniform coating over the core 270. The thickness of the nonuniform coating will vary by less than plus or minus 1.5 mils (0.0015 inches).

Once the body of the airfoil has been built up by the nonuniform covering 274, a thermal barrier covering 278 is applied over the nonuniform covering 274. The thermal barrier covering 278 is of a material which is different than the material of the covering 274 and may be provided with a bond coat or covering, similar to the bond covering 80 of FIG. 2.

Once the thermal barrier covering 278 has been applied to the nonuniform covering 274, the core or base 270 is removed to provide an internal passage 282 in the airfoil 284 (see FIG. 15). The hollow airfoil 284 is then subjected to hot isostatic pressing to increase the density of the airfoil 284 and to eliminate any porosity which may be present in the nonuniform coating 274.

The core 270 can be made of any material which does not adversely react with the nonuniform covering 274 and which is easily removed as by being melted out or leached. With one particular type of airfoil, the core 270 could advantageously be made of aluminum.

Summary

In view of the foregoing description, it is apparent that the present invention provides a new and improved method and apparatus for applying a covering of either uniform or nonuniform thickness to a workpiece. When a nonuniform covering is applied to a workpiece, the resultant product will have a configuration which is different than the configuration of the workpiece to which the covering was applied. The workpiece to which the covering is applied can have many different constructions and may be formed of many different materials so long as the workpiece is capable of receiving the covering.

In one specific utilization of the invention, a covering 64 of a uniform thickness is accurately applied to an airfoil 22. In another specific utilization of the invention, an airfoil 284 is formed on a workpiece or core 270 which is subsequently removed from the airfoil. It should be understood that it is contemplated that the present invention could be utilized in association with many different types of objects other than airfoils.

An apparatus constructed in accordance with the present invention includes a spray gun 24 which is utilized to direct a flow of material toward a workpiece, such as the airfoil 22. A sensor assembly 28 is provided to determine the thickness of the covering 64 applied to the workpiece 22 without engaging the workpiece. A control assembly 32 is connected with the sensor assembly 28 and the spray gun 24. The control assembly 32 is effective to compare the thickness of the covering of material which is actually applied to the workpiece 22 with a desired thickness and is effective to regulate the operation of the spray gun 24 in such a manner as to effect the application to the workpiece of a covering having the desired thickness.

Although it is contemplated that many different types of sensor assemblies 28 could be utilized in association with the plasma spray gun 24 to determine the thickness of the covering applied to the workpiece, an optical sensor assembly is advantageously utilized. The optical sensor assembly 28 is utilized to detect when a surface area on either the workpiece or a covering is at the focal point of a lens 234. This is accomplished by sensing changes in the light reflected from the surface area with changes in the distance between the sensor assembly 28 and the workpiece.

During changes in the distance between the workpiece and the sensor assembly in one direction, the light reflected from the workpiece 22 back to a photosensor 226 decreases as the distance between the sensor assembly and the surface area approaches a focal length distance (FIG. 9). As this is occurring, the light reflected back to a light source 210 increases. Once the focal length distance is reached between the surface area and the sensor assembly 28, a minimum amount of light is reflected back to the photosensor 226 (FIG. 2) and a maximum amount of light is reflected back to the light source 210. Continued relative movement between the sensor assembly 28 and the workpiece 22 results in an increase in the amount of light reflected to the photosensor 226 and a resulting decrease in the amount of light reflected back the light source 210. Therefore, it is possible to detect when the surface area and sensor assembly are spaced apart by the focal distance by detecting when the amount of light reflected to the photosensor 226 stops decreasing and starts increasing.

By utilizing the method and apparatus of the present invention, it is possible to control the operation of the plasma spray gun 24 to apply a covering 64 which will have a thickness which is within 1.5 mils (0.0015 inches) of a desired thickness. The accurate application of the covering 64 to the workpiece 22 is promoted by detecting the thickness of the covering at several different points on the workpiece and controlling the operation of the plasma spray gun 24 as a function of differences between the desired covering thickness and the actual covering thickness as sensed at several points on the workpiece.

The application of a covering 64 of the desired thickness to the workpiece 22 is further promoted by applying the covering in layers formed of longitudinally extending strips. The central axes of the strips in one layer may be offset from the central axes of the strip of a next adjacent layer for more precise control of overall thickness uniformity.

When the covering is to be applied to a workpiece having a complex configuration, such as the airfoil 22, the accurate application of the covering is greatly promoted by utilizing a drive apparatus 36 having six degrees of freedom of relative movement. Thus, an apparatus constructed in accordance with the present invention can effect relative movement between the airfoil and a spray gun along three different axes. In addition the apparatus can effect rotational movement between the airfoil and the spray gun about three axes, that is, the X, Y, and Z axes.

What is claimed is:

1. An apparatus for applying a covering of material to at least a portion of a workpiece, said apparatus comprising spray means for directing a flow of material toward the workpiece, first means for effecting relative movement between said spray means and the workpiece along each of three transversely extending axes, second means for effecting rotational movement between said spray means and the workpiece about each of three transversely extending axes, sensor means for detecting the thickness of a covering of material applied to the workpiece by said spray means, and control means connected with said sensor means and said spray means for comparing the detected thickness of the covering of material with a desired thickness and for regulating the operation of said spray means as a function of the difference between the detected thickness of the covering and the desired thickness of the covering.

2. An apparatus as set forth in claim 1 wherein said control means includes means for effecting relative movement between said spray means and the workpiece in such a manner as to effect the application to the workpiece of a covering having different thicknesses over different surface areas of the workpiece.

3. An apparatus as set forth in claim 2 further including printer means for providing a record of the different thicknesses of the covering over a plurality of different surface areas of the workpiece.

4. An apparatus as set forth in claim 1 wherein said control means includes means for effecting relative movement between said spray means and the workpiece in such a manner as to effect the application of a covering of substantially uniform thickness over at least a portion of the workpiece.

5. An apparatus as set forth in claim 1 wherein said control means includes means for effecting operation of said sensor means to detect the thickness of the covering in each of a plurality of predetermined locations on the workpiece, said control means including means for comparing the detected thickness of the covering at each of the plurality of locations with the desired thickness of the covering at each of the locations and for regulating the operation of said spray means as a function of the difference between the detected thickness of the covering at each of the plurality of locations and the desired thickness of the covering at each of the plurality of locations.

6. An apparatus as set forth in claim 1 wherein said first means is operable to effect relative movement between said sensor means and the workpiece to vary the distance therebetween, said sensor means including a light source, lens means for directing light from said light source against a surface area in such a manner as to cause the amount of light reflected from the surface area back to the light source to increase as the distance between said sensor means and the surface area changes in a first direction from a first distance to a predetermined distance during operation of said first means to change the distance between said sensor means and the workpiece and to cause the amount of light reflected from the surface area back to the light source to decrease as the distance between said sensor means and the surface area changes in the first direction from the predetermined distance to a second distance, said control means including means for detecting when the amount of light reflected back to the light source stops increasing and starts decreasing to thereby detect when said sensor means is spaced apart from the surface area by the predetermined distance.

7. An apparatus as set forth in claim 1 wherein said control means is operable to effect operation of said first means to cause relative movement between said spray means and the workpiece in such a manner as to apply a first layer of the covering in strips, said control means being operable to effect operation of said first means to cause relative movement between said spray means and the workpiece in such a manner as to apply a second layer of the covering in strips which overlie the strips of the first layer of the covering and have longitudinal central axes which are offset from longitudinal central axes of the strips of the first layer of the covering to thereby facilitate the application to the workpiece of a covering having a desired thickness.

8. An apparatus as set forth in claim 1 wherein said sensor means includes a light source, photosensor means for providing an output signal which varies as a function of variations in the amount of light transmitted to said photosensor means, lens means for directing light from said light source against a surface area in such a manner as to cause the amount of light reflected from the surface area to said photosensor means to decrease as the distance between said sensor means and the surface changes in a first direction from a first distance to a predetermined distance during operation of said first means to change the distance between said sensor means and the workpiece and to cause the amount of light reflected from the surface area to said photosensor means to increase as the distance between said sensor means and the surface area changes in the first direction from the predetermined distance to a second distance, said control means including means for detecting when the amount of light reflected to said photosensor means stops decreasing and starts increasing to thereby detect when said sensor means is spaced apart from the surface area by the predetermined distance.

9. An apparatus as set forth in claim 1 wherein said sensor means includes a lens having a focal point which is located a predetermined distance from said lens, said control means including means for detecting when a surface area on the workpiece has been moved to the focal point of said lens.

10. An apparatus as set forth in claim 1 wherein said sensor means includes a source of electrical energy and means for utilizing said energy to detect the thickness of the covering.

11. An apparatus as set forth in claim 10 wherein said means for utilizing said energy includes means for converting electrical energy to radiant energy and means for directing the radiant energy against a surface area of the workpiece.

12. An apparatus as set forth in claim 11 wherein said means for converting electrical energy to radiant energy includes a source of noncoherent light, said means for directing the radiant energy against a surface area includes means for directing light from said light source against a surface area.

13. An apparatus as set forth in claim 1 wherein the workpiece has an internal passage, said apparatus further including means for causing cooling fluid to flow through the internal passage in the workpiece during the application of the covering to the workpiece.

14. An apparatus as set forth in claim 1 wherein said control means includes means for effecting relative movement between said spray means and the workpiece and means for varying the speed of relative movement between said spray means and the workpiece to vary the amount of material which is applied over a surface area of the workpiece during relative movement between the workpiece and spray means.

15. An apparatus as set forth in claim 1 further including means for supplying to said spray means powdered material having a first composition, means for supplying to said spray means powdered material having a second composition, said control means including means for effecting operation of said spray means to apply a first covering of the first composition over the workpiece, for effecting operation of said spray means to apply a transition covering which is a mixture of the first and second compositions over the first covering, and for effecting operation of said spray means to apply a second covering of the second composition over the transition covering.

16. An apparatus as set forth in claim 1 wherein said second means is operable to effect rotational movement between said spray means and the workpiece about at least some of the same three axes along which said first means is effective to cause relative movement between said spray means and the workpiece.

17. An apparatus as set forth in claim 16 wherein said first means includes means for effecting relative movement between said sensor means and the workpiece along each of the three transversely extending axes and wherein said second means includes means for effecting rotational movement between said sensor means and the workpiece about at least some of the three transversely extending axes.

18. An apparatus as set forth in claim 17 wherein said first means includes a first motor, first drive means connected with said first motor and said spray means for moving said spray means along a first one of the three transversely extending axes upon operation of the first motor, a second motor, and second drive means for moving said sensor means along the first one of the three transversely extending axes upon operation of said second motor.

19. An apparatus for applying a covering of material to at least a portion of a workpiece, said apparatus comprising spray means for directing a flow of material toward the workpiece, sensor means for detecting the thickness of a covering of material applied to the workpiece by said spray means, drive means for effecting relative movement between said sensor means and the workpiece to vary the distance therebetween, said sensor means including a light source, lens means for directing light from said light source against a surface area in such a manner as to cause the amount of light reflected from the surface area back to the light source to increase as the distance between said sensor means and the surface changes in a first direction from a first distance to a predetermined distance during operation of said drive means to change the distance between said sensor means and the workpiece and to cause the amount of light reflected from the surface area back to the light source to decrease as the distance between said sensor means and the surface area changes in the first direction from the predetermined distance to a second distance, and control means connected with said sensor means and said spray means for comparing the detected thickness of the covering of material with a desired thickness and for regulating the operation of said spray means as a function of the difference between the detected thickness of the covering and the desired thickness of the covering, said control means including means for detecting when the amount of light reflected back to the light source stops increasing and starts decreasing to thereby detect when said sensor means is spaced apart from the surface area by the predetermined distance.

20. An apparatus as set forth in claim 19 further including second drive means for effecting relative movement between said spray means and the workpiece, said control means being operable to effect operation of said second drive means to cause relative movement between said spray means and the workpiece in such a manner as to apply a first layer of the covering in strips, and control means being operable to effect operation of said second drive means to cause relative movement between said spray means and the workpiece in such a manner as to apply a second layer of the covering in strips which overlie the strips of the first layer of the covering and have longitudinal central axes which are offset from longitudinal central axes of the strips of the first layer of the covering to thereby facilitate the application to the workpiece of a covering having a desired thickness.

21. An apparatus as set forth in claim 19 further including printer means for providing a record of the actual thickness of the covering applied to the workpiece.

22. An apparatus as set forth in claim 19 wherein the workpiece has an internal passage, said apparatus further including means for causing cooling fluid to flow through the internal passage in the workpiece during the application of the covering to the workpiece.

23. An apparatus as set forth in claim 19 wherein said control means includes means for effecting relative movement between said spray means and the workpiece and means for varying the speed of relative movement between said spray means and the workpiece to vary the amount of material which is applied over a surface area of the workpiece during relative movement between the workpiece and spray means.

24. An apparatus as set forth in claim 19 further including means for supplying to said spray means powdered material having a first composition, means for supplying to said spray means powdered material having a second composition, said control means including means for effecting operation of said spray means to apply a first covering of the first composition over the workpiece, for effecting operation of said spray means to apply a transition covering which is a mixture of the first and second compositions over the first covering, and for effecting operation of said spray means to apply a second covering of the second composition over the transition covering.

25. An apparatus as set forth in claim 19 wherein said control means includes means for effecting relative movement between said spray means and the workpiece in such a manner as to effect the application to the workpiece of a covering having different thicknesses over different surface areas of the workpiece.

26. An apparatus as set forth in claim 25 further including printer means for providing a record of the different thicknesses of the covering over a plurality of different surface areas of the workpiece.

27. An apparatus as set forth in claim 19 wherein said control means includes means for effecting relative movement between said spray means and the workpiece in such a manner as to effect the application of a covering of substantially uniform thickness over at least a portion of the workpiece.

28. An apparatus as set forth in claim 19 wherein said control means includes means for effecting operation of said sensor means to detect the thickness of the covering in each of a plurality of predetermined locations on the workpiece, said control means including means for comparing the detected thickness of the covering at each of the plurality of locations with the desired thickness of the covering at each of the locations and for regulating the operation of said spray means as a function of the difference between the detected thickness of the covering at each of the plurality of locations and the desired thickness of the covering at each of the plurality of locations.

29. An apparatus as set forth in claim 19 wherein said control means includes means for effecting operation of said sensor means to direct light from said light source against a plurality of surface areas disposed in predetermined locations relative to the workpiece, said control means being effective to detect when the amount of light reflected back to the light source from each of the plurality of surface areas stops increasing and starts decreasing.

30. An apparatus for applying a covering of material to at least a portion of a workpiece, said apparatus comprising spray means for directing a flow of material toward the workpiece, sensor means for detecting the thickness of a covering of material applied to the workpiece by said spray means, control means connected with said sensor means and said spray means for comparing the detected thickness of the covering of material with a desired thickness and for regulating the operation of said spray means as a function of the difference between the detected thickness of the covering and the desired thickness of the covering, and drive means for effecting relative movement between the workpiece and said spray means, said drive means including first motor means for effecting relative movement between the workpiece and said spray means along a first axis, second motor means for effecting rotational movement of the workpiece about the first axis, third motor means for effecting relative movement between the workpiece and said spray means along a second axis which extends perpendicular to said first axis, fourth motor means for effecting rotational movement of the workpiece about the second axis, fifth motor means for effecting relative movement between the workpiece and said spray means along a third axis which extends perpendicular to said first and second axes, and sixth motor means for effecting rotational movement of the workpiece about the third axis.

31. An apparatus as set forth in claim 30 further including seventh motor means for effecting movement of said sensor means relative to the workpiece independently of relative movement between the workpiece and said spray means.

32. An apparatus for applying a covering of material to at least a portion of a workpiece, said apparatus comprising spray means for directing a flow of material toward the workpiece, sensor means for detecting the thickness of a covering of material applied to the workpiece by said spray means, drive means for effecting relative movement between said sensor means and the workpiece to vary the distance therebetween, said sensor means including a light source, photosensor means for providing an output signal which varies as a function of variations in the amount of light transmitted to said photosensor means, lens means for directing light from said light source against a surface area in such a manner as to cause the amount of light reflected from the surface area to said photosensor means to decrease as the distance between said sensor means and the surface changes in a first direction from a first distance to a predetermined distance during operation of said drive means to change the distance between said sensor means and the workpiece and to cause the amount of light reflected from the surface area to said photosensor means to increase as the distance between said sensor means and the surface area changes in the first direction from the predetermined distance to a second distance, and control means connected with said sensor means and said spray means for comparing the detected thickness of the covering of material with a desired thickness and for regulating the operation of said spray means as a function of the difference between the detected thickness of the covering and the desired thickness of the covering, said control means including means for detecting when the amount of light reflected to said photosensor means stops decreasing and starts increasing to thereby detect when said sensor means is spaced apart from the surface area by the predetermined distance.

33. An apparatus as set forth in claim 32 wherein said control means includes means for effecting relative movement between said spray means and the workpiece in such a manner as to effect the application to the workpiece of a covering having different thicknesses over different surface areas of the workpiece.

34. An apparatus as set forth in claim 33 further including printer means for providing a record of the different thicknesses of the covering over a plurality of different surface areas of the workpiece.

35. An apparatus as set forth in claim 32 wherein said control means includes means for effecting relative movement between said spray means and the workpiece in such a manner as to effect the application of a covering of substantially uniform thickness over at least a portion of the workpiece.

36. An apparatus as set forth in claim 35 further including first means for effecting relative movement between said spray means and the workpiece along each of three transversely extending axes and second means for effecting rotational movement between said spray means and the workpiece about each of three transversely extending axes.

37. An apparatus as set forth in claim 36 wherein said second means is operable to effect rotational movement between said spray means and the workpiece about at least some of the same three axes along which said first means is effective to cause relative movement between said spray means and the workpiece.

38. An apparatus as set forth in claim 32 wherein said control means includes means for effecting operation of said sensor means to detect the thickness of the covering in each of a plurality of predetermined locations on the workpiece, said control means including means for comparing the detected thickness of the covering at each of the plurality of locations with the desired thickness of the covering at each of the locations and for regulating the operation of said spray means as a function of the difference between the detected thickness of the covering at each of the plurality of locations and the desired thickness of the covering at each of the plurality of locations.

39. An apparatus as set forth in claim 32 further including second drive means for effecting relative movement between said spray means and the workpiece, said control means being operable to effect operation of said second drive means to cause relative movement between said spray means and the workpiece in such a manner as to apply a first layer of the covering in strips, said control means being operable to effect operation of said second drive means to cause relative movement between said spray means and the workpiece in such a manner as to apply a second layer of the covering in strips which overlie the strips of the first layer of the covering and have longitudinal central axes which are offset from longitudinal central axes of the strips of the first layer of the covering to thereby facilitate the application to the workpiece of a covering having a desired thickness.

40. An apparatus as set forth in claim 32 further including printer means for providing a record of the actual thickness of the covering applied to the workpiece.

41. An apparatus as set forth in claim 32 wherein the workpiece has an internal passage, said apparatus further including means for causing cooling fluid to flow through the internal passage in the workpiece during the application of the covering to the workpiece.

42. An apparatus as set forth in claim 32 wherein said drive means includes means for effecting relative movement between said spray means and the workpiece and between said sensor means and the workpiece along a first axis which extends transversely to a path of flow of material from said spray means toward the workpiece and means for effecting rotational movement of the workpiece about the first axis.

43. An apparatus as set forth in claim 32 wherein said control means includes means for effecting relative movement between said spray means and the workpiece and means for varying the speed of relative movement between said spray means and the workpiece to vary the amount of material which is applied over a surface area of the workpiece during relative movement between the workpiece and spray means.

44. An apparatus as set forth in claim 32 further including means for supplying to said spray means powdered material having a first composition, means for supplying to said spray means powdered material having a second composition, said control means including means for effecting operation of said spray means to apply a first covering of the first composition over the workpiece, for effecting operation of said spray means to apply a transition covering which is a mixture of the first and second compositions over the first covering, and for effecting operation of said spray means to apply a second covering of the second composition over the transition covering.

45. An apparatus for use in accurately applying a covering of material to at least a portion of an airfoil, said apparatus comprising spray means for applying material to the airfoil, means for supplying material in a powdered form to said spray means, said spray means including means for heating the material and directing a flow of the heated material toward the airfoil, drive means for effecting relative movement between the airfoil and said spray means to enable the flow of heated material to be distributed over the surface of the airfoil to form a covering, sensor means for detecting the thickness of the covering applied to the airfoil to within less than 0.0005 inches of the actual thickness of the covering, said drive means including means for effecting relative movement between said sensor means and the airfoil to vary the distance therebetween, said sensor means including a light source, means for directing light from said light source against a surface area in such a manner as to cause the amount of light reflected from the surface area back to the light source to increase as the distance between said sensor means and the surface area changes in a first direction from a first distance to a predetermined distance during operation of said drive means to vary the distance between said sensor means and the airfoil and to cause the amount of light reflected from the surface area back to the light source to decrease as the distance between said sensor means and the surface area changes in the first direction from the predetermined distance to a second distance, and control means connected with said spray means, drive means and sensor means for effecting operation of said spray means to apply to the airfoil a covering having a thickness which differs from a desired thickness by less than 0.0015 inches, said control means including means for detecting when the amount of light reflected back to the light source stops increasing and starts decreasing to thereby detect when said sensor means is spaced from the surface area by the predetermined distance.

46. An apparatus as set forth in claim 45 wherein said control means cooperates with said drive means and said spray means to effect the application of the covering to the airfoil in a plurality of layers each of which is formed by a plurality of strips of material applied by said spray means.

47. An apparatus as set forth in claim 46 wherein said control means cooperates with said spray means and said drive means to effect the application of one of the layers with the longitudinal axes of strips in the one layer offset from the longitudinal axes of strips in a next adjacent layer.

48. An apparauts as set forth in claim 45 wherein said means for supplying material in a powdered form to said spray means includes means for supplying powdered material having a first composition to said spray means and means for supplying powdered material having a second composition to said spray means, said control means including means for effecting operation of said spray means to apply a first covering of the first composition over the airfoil, for effecting operation of said spray means to apply a transition covering which is a mixture of the first and second compositions over the first covering, and for effecting operation of said spray means to apply a second covering of the second composition over the transition covering to thereby form over the airfoil the covering which differs from a desired thickness by less than 0.0015 inches and is formed by at least the first, transition and second coverings.

49. An apparatus as set forth in claim 45 wherein the airfoil has an internal passage, said apparatus further including means for causing cooling fluid to flow through the internal passage in the airfoil during the application of the heated material to the airfoil.

50. An apparatus as set forth in claim 45 wherein said sensor means includes a source of electrical energy and means for utilizing energy from said source of electrical energy to detect the thickness of the covering to within less than 0.0005 inches of the actual thickness of the covering without engaging the covering with a solid object.

51. An apparatus as set forth in claim 45 wherein said control means includes means for varying the speed of relative movement between said spray means and the airfoil to vary the amount of material which is applied over a surface area of the airfoil during relative movement between the airfoil and spray means.

52. An apparatus as set forth in claim 45 wherein said control means includes means for effecting operation of said sensor means to detect the thickness of the covering in each of a plurality of predetermined locations on the airfoil, said control means including means for comparing the detected thickness of the covering at each of the plurality of locations with the desired thickness of the covering at each of the plurality of locations and for regulating the operation of said spray means as a function of the difference between the detected thickness of the covering at each of the plurality of locations and the desired thickness of the covering.

53. An apparatus for use in accurately applying a covering of material to at least a portion of an airfoil, said apparatus comprising spray means for applying material to the airfoil, means for supplying material in a powdered form to said spray means, said spray means including means for heating the material and directing a flow of the heated material toward the airfoil, drive means for effecting relative movement between the airfoil and said spray means to enable the flow of heated material to be distributed over the surface of the airfoil to form a covering, sensor means for detecting the thickness of the covering applied to the airfoil to within less than 0.0005 inches of the actual thickness of the covering, and control means connected with said spray means, drive means and sensor means for effecting operation of said spray means to apply to the airfoil a covering having a thickness which differs from a desired thickness by less than 0.0015 inches, said control means including means for varying the speed of relative movement between said spray means and the airfoil to vary the amount of material which is applied over a surface area of the airfoil during relative movement between the airfoil and spray means.

54. An apparatus as set forth in claim 53 wherein said drive means includes means for effecting relative movement between said sensor means and the airfoil to vary the distance therebetween, said sensor means including a light source, means for directing light from said light source against a surface area in such a manner as to cause the amount of light reflected from the surface area back to the light source to increase as the distance between said sensor means and the surface area changes in a first direction from a first distance to a predetermined distance during operation of said drive means to vary the distance between said sensor means and the airfoil and to cause the amount of light reflected from the surface area back to the light source to decrease as the distance between said sensor means and the surface area changes in the first direction from the predetermined distance to a second distance, said control means including means for detecting when the amount of light reflected back to the light source stops increasing and starts decreasing to thereby detect when said sensor means is spaced from the surface area by the predetermined distance.

55. An apparatus as set forth in claim 54 wherein said control means includes means for effecting operation of said sensor means to detect the thickness of the covering in each of a plurality of predetermined locations on the airfoil, said control means including means for comparing the detected thickness of the covering at each of the plurality of locations with the desired thickness of the covering at each of the plurality of locations and for regulating the operation of said spray means as a function of the difference between the detected thickness of the covering at each of the plurality of locations and the desired thickness of the covering.

56. An apparatus as set forth in claim 53 wherein said control means cooperates with said drive means and said spray means to effect the application of the covering to the airfoil in a plurality of layers each of which is formed by a plurality of strips of material applied by said spray means.

57. An apparatus as set forth in claim 56 wherein said control means cooperates with said spray means and said drive means to effect the application of one of the layers with the longitudinal axes of strips in the one layer offset from the longitudinal axes of strips in a next adjacent layer.

58. An apparatus as set forth in claim 53 wherein said means for supplying material in a powdered form to said spray means includes means for supplying powdered material having a first composition to said spray means and means for supplying powdered material having a second composition to said spray means, said control means including means for effecting operation of said spray means to apply a first covering of the first composition over the airfoil, for effecting operation of said spray means to apply a transition covering which is a mixture of the first and second compositions over the first covering, and for effecting operation of said spray means to apply a second covering of the second composition over the transition covering to thereby form over the airfoil the covering which differs from a desired thickness by less than 0.0015 inches and is formed by at least the first, transition and second coverings.

59. An apparatus as set forth in claim 53 wherein the airfoil has an internal passage, said apparatus further including means for causing cooling fluid to flow through the internal passage in the airfoil during the application of the heated material to the airfoil.

60. An apparatus as set forth in claim 53 wherein said sensor means includes a source of electrical energy and means for utilizing energy from said source of electrical energy to detect the thickness of the covering to within less than 0.0005 inches of the actual thickness of the covering without engaging the covering with a solid object.

61. An apparatus as set forth in claim 53 wherein said control means includes means for effecting operation of said drive means to cause relative movement between said spray means and the workpiece in such a manner as to effect the application to the workpiece of a covering having different thicknesses over different surface areas of the workpiece.

62. An apparatus as set forth in claim 61 further including printer means for providing a record of the different thicknesses of the covering over a plurality of different surface areas of the workpiece.

63. An apparatus as set forth in claim 53 wherein said control means includes means for effecting operation of said drive means to cause relative movement between said spray means and the workpiece in such a manner as to effect the application of a covering of substantially uniform thickness over at least a portion of the workpiece.

64. An apparatus as set forth in claim 53 wherein said control means includes means for effecting operation of said drive means to cause relative movement between said spray means and the workpiece along each of three transversely extending axes and means for effecting operation of said drive means to cause rotational movement between said spray means and the workpiece about each of three transversely extending axes.

65. An apparatus as set forth in claim 53 wherein said control means includes means for effecting operation of said sensor means to detect the thickness of the covering in each of a plurality of predetermined locations on the workpiece, said control means including means for comparing the detected thickness of the covering at each of the plurality of locations with the desired thickness of the covering at each of the locations.

66. An apparatus as set forth in claim 53 wherein said sensor means includes a lens having a focal point which is located a predetermined distance from said lens, said control means including means for detecting when a surface area on the workpiece has been moved to the focal point of said lens.

67. An apparatus as set forth in claim 53 wherein said sensor means includes a source of electrical energy and means for utilizing said energy to detect the thickness of the covering.

68. An apparatus as set forth in claim 67 wherein said means for utilizing said energy includes means for converting electrical energy to radiant energy and means for directing the radiant energy against a surface area.

69. An apparatus as set forth in claim 68 wherein said means for converting electrical energy to radiant energy includes a source of noncoherent light, said means for directing the radiant energy against a surface area includes means for directing light from said light source against a surface area.

70. An apparatus for applying a covering having a predetermined thickness to at least a portion of a workpiece, said apparatus comprising gripper means for holding the workpiece, spray means for directing a flow of material toward the workpiece while it is held by said gripper means, means for supplying said spray means with the material in powdered form, said spray means including means for heating the material and means for directing a flow of the heated material toward the workpiece, drive means for effecting relative movement between said spray means and said gripper means during operation of said spray means to effect the application of a covering of the material to the workpiece, said drive means including means for effecting relative movement between said gripper means and said spray means along each of three transversely extending axes and for effecting rotational movement between said spray means and the workpiece about each of three transversely extending axes, sensor means for sensing the thickness of the covering of material applied to the workpiece without engaging the covering with a solid object and while the workpiece is held by said gripper means, said sensor means including a source of electrical energy and means for utilizing energy from said source of electrical energy to detect the thickness of the covering, and control means connected with said spray means, drive means and sensor means for effecting operation of said spray means and drive means to apply to the workpiece an initial covering having a thickness which is less than the predetermined thickness, for effecting operation of said sensor means to sense the thickness of the initial covering, and for effecting operation of said spray means and drive means to increase the thickness of the initial covering to the predetermined thickness.

71. An apparatus as set forth in claim 70 wherein said means for utilizing said energy includes means for converting electrical energy to radiant energy and means for directing the radiant energy against the covering.

72. An apparatus as set forth in claim 70 wherein said control means includes means for effecting relative movement between said spray means and said gripper means in such a manner as to effect the application to the workpiece of a covering having different thicknesses over different surface areas of the workpiece.

73. An apparatus as set forth in claim 70 wherein said control means includes means for effecting relative movement between said spray means and said gripper means in such a manner as to effect the application of a covering of substantially uniform thickness over at least a portion of the workpiece.

74. An apparatus as set forth in claim 70 wherein said means for effecting rotational movement is operable to effect rotational movement between said spray means and the workpiece about at least some of said three transversely extending axes.

75. An apparatus as set forth in claim 70 wherein said control means includes means for effecting operation of said sensor means to detect the thickness of the covering at each of a plurality of predetermined locations on the workpiece, said control means including means for comparing the detected thickness of the covering at each of the plurality of locations with the desired thickness of the covering at each of the locations and for regulating the operation of said spray means and drive means as a function of the difference between the detected thickness of the covering at each of the plurality of locations and the desired thickness of the covering at each of the plurality of locations.

76. An apparatus for use in applying a covering of material to at least a portion of a workpiece, said apparatus comprising gripper means for holding the workpiece, spray means for directing a flow of material toward the workpiece while it is held by said gripper means, drive means for effecting relative movement between said spray means and said gripper means, said drive means includes first means for effecting relative movement between said spray means and the workpiece along each of three transversely extending axes and second means for effecting rotational movement between said spray means and the workpiece about each of three transversely extending axes, sensor means for detecting the location of a point on the surface of a covering of material applied to the workpiece by said spray means while the workpiece is held by said gripper means, and control means connected with said spray means, drive means, and sensor means for effecting operation of said sprays means to apply to the workpiece a covering having a point on its outer surface which is disposed in a predetermined location relative to the workpiece.

77. An apparatus as set forth in claim 76 wherein said sensor means includes a source of electrical energy and means for utilizing energy from said source of electrical energy to detect the location of the point on the covering of material.

78. An apparatus as set forth in claim 76 wherein said control means includes means for effecting operation of said spray means in such a manner as to effect the application to the workpiece of a covering having different thicknesses over different surface areas of the workpiece.

79. An apparatus as set forth in claim 76 wherein said control means includes means for effecting operation of said spray means in such a manner as to effect the application of a covering of substantially uniform thickness over at least a portion of the workpiece.

80. An apparatus as set forth in claim 76 wherein said second means is operable to effect rotational movement between said spray means and the workpiece about at least some of the same three axes along which said first means is effective to cause relative movement between said spray means and the workpiece.

81. An apparatus as set forth in claim 76 wherein said first means includes means for effecting relative movement between said sensor means and the workpiece along at least some of the three transversely extending axes and wherein said second means includes means for effecting rotational movement between said sensor means and the workpiece about at least some of the three transversely extending axes.

82. An apparatus as set forth in claim 76 wherein said drive means is operable to change the distance between the workpiece and said sensor means, said sensor means includes a light source, lens means for directing light from said light source against the surface of the covering of material in such a manner as to cause the amount of light reflected from the surface back to the light source to increase as the distance between said sensor means and the surface changes in a first direction from a first distance to a predetermined distance during operation of said drive means to change the distance between said sensor means and the workpiece and to cause the amount of light reflected from the surface back to the light source to decrease as the distance between said sensor means and the surface changes in the first direction from the predetermined distance to a second distance, said control means including means for detecting when the amount of light reflected back to the light source stops increasing and starts decreasing to thereby detect when said sensor means is spaced apart from the surface area by the predetermined distance.

83. An apparatus as set forth in claim 76 wherein said control means is operable to effect operation of said drive means to cause relative movement between said spray means and the workpiece in such a manner as to apply a first layer of the covering in strips, said control means being operable to effect operation of said drive means to cause relative movement between said spray means and the workpiece in such a manner as to apply a second layer of the covering in strips which overlie the strips of the first layer of the covering and have longitudinal central axes which are offset from longitudinal central axes of the strips of the first layer of the covering to thereby facilitate the application to the workpiece of a covering having a desired thickness.

84. An apparatus as set forth in claim 76 wherein the workpiece has an internal passage, said apparatus further including means for causing cooling fluid to flow through the internal passage in the workpiece during the application of the covering to the workpiece.

85. An apparatus as set forth in claim 76 further including means for supplying to said spray means powdered material having a first composition, means for supplying to said spray means powdered material having a second composition, said control means including means for effecting operation of said spray means to apply a first covering of the first composition over the workpiece, for effecting operation of said spray means to apply a transition covering which is a mixture of the first and second composition over the first covering, and for effecting operation of said spray means to apply a second covering of the second composition over the transition covering.

86. An apparatus as set forth in claim 76 wherein said sensor means includes a source of light and lens means for directing light from the source of light against the surface of the covering of material and for directing light reflected from the surface back to said source of light, said drive means including means for varying the distance between said lens means and the surface of the covering of material in a first direction to first increase the amount of light reflected back to said source of light and to subsequently decrease the amount of light reflected back to said source of light from the surface, said sensor means further including means for detecting when the amount of light reflected back to said light source stops increasing and starts decreasing as the distance between said lens means and the surface is varied in the first direction to detect when said lens means is spaced apart from the surface by a predetermined distance.

87. An apparatus as set forth in claim 86 wherein said means for detecting when the amount of light reflected back to said light source stops increasing and starts decreasing includes means for storing data corresponding to the amount of light reflected back to the light source at each of a plurality of distances between said lens means and the surface, means for comparing the stored data for a plurality of distances, and means for determining when the stored data indicates that the light reflected back to said source of light stops increasing and starts decreasing.

88. An apparatus as set forth in claim 86 wherein said means for varying the distance between said lens means and the surface of the covering of material includes means for varying the distance through a series of incremental distances, said means for detecting when the amount of light reflected back to said light source stops increasing and starts decreasing includes a series of data storage locations, means for transmitting to said data storage locations data indicative of the amount of light reflected back to said source of light at a plurality of incremental distances, said means for transmitting data to said data storage locations including means for entering data for each incremental distance in turn into a first one of said data storage locations and means for shifting data from each data storage location to a next data storage location in the series of data storage locations and for effecting the removal of the data in a last one of the data storage locations from the series of data storage locations whenever data is to be entered into the first data storage location, and means for comparing the data stored in the first data storage location with the data stored in the last data storage location to determine when the data stored in the first data storage location is indicative of an amount of light which is less than the amount of light indicated by the data stored in the last data storage location.

89. An apparatus as set forth in claim 76 wherein said sensor means includes means for detecting the location of the point on the surface of the covering to within less than 0.0005 inches of the actual thickness of the covering, said control means being operable to effect operation of said spray means to apply the covering with the point on its outer surface disposed at a location which differs from a desired location by less than 0.0015 inches.

90. An apparatus for use in applying a covering of material to at least a portion of a workpiece, said apparatus comprising gripper means for holding the workpiece, spray means for directing a flow of material toward the workpiece while it is held by said gripper means, drive means for effecting relative movement between said spray means and said gripper means, sensor means for detecting the location of a point on the surface of a covering of material applied to the workpiece by said spray means while the workpiece is held by said gripper means, said drive means being operable to change the distance between the workpiece and said sensor means, said sensor means includes a light source, lens means for directing light from said light source against the surface of the covering of material in such a manner as to cause the amount of light reflected from the surface back to the light source to increase as the distance between said sensor means and the surface changes in a first direction from a first distance to a predetermined distance during operation of said drive means to change the distance between said sensor means and the workpiece and to cause the amount of light reflected from the surface back to the light source to decrease as the distance between said sensor means and the surface changes in the first direction from the predetermined distance to a second distance, and control means connected with said spray means, drive means, and sensor means for effecting operation of said spray means to apply to the workpiece a covering having a point on its outer surface which is disposed in a predetermined location relative to the workpiece, said control means including means for detecting when the amount of light reflected back to the light source stops increasing and starts decreasing to thereby detect when said sensor means is spaced apart from the surface area by the predetermined distance.

91. An apparatus as set forth in claim 90 wherein said drive means includes motor means for effecting relative movement between said gripper means and said spray means along a straight path and for effecting rotational movement between said gripper means and said spray means about the straight path.

92. An apparatus as set forth in claim 90 wherein said control means includes means for effecting operation of said spray means in such a manner as to effect the application to the workpiece of a covering having different thicknesses over different surface areas of the workpiece.

93. An apparatus as set forth in claim 90 wherein said control means includes means for effecting operation of said spray means in such a manner as to effect the application of a covering of substantially uniform thickness over at least a portion of the workpiece.

94. An apparatus as set forth in claim 90 wherein said drive means is operable to effect rotational movement between said spray means and said gripper means about at least three axes.

95. An apparatus as set forth in claim 90 wherein said control means is operable to effect operation of said drive means to cause relative movement between said spray means and the workpiece in such a manner as to apply a first layer of the covering in strips, said control means being operable to effect operation of said drive means to cause relative movement between said spray means and the workpiece in such a manner as to apply a second layer of the covering in strips which overlie the strips of the first layer of the covering and have longitudinal central axes which are offset from longitudinal central axes of the strips of the first layer of the covering to thereby facilitate the application to the workpiece of a covering having a desired thickness.

96. An apparatus as set forth in claim 90 wherein the workpiece has an internal passage, said apparatus further including means for causing cooling fluid to flow through the internal passage in the workpiece during the application of the covering to the workpiece.

97. An apparatus as set forth in claim 90 further including means for supplying to said spray means powdered material having a first composition, means for supplying to said spray means powdered material having a second composition, said control means including means for effecting operation of said spray means to apply a first covering of the first composition over the workpiece, for effecting operation of said spray means to apply a transition covering which is a mixture of the first and second composition over the first covering, and for effecting operation of said spray means to apply a second covering of the second composition over the transition covering.

98. An apparatus as set forth in claim 90 wherein said means for detecting when the amount of light reflected back to said light source stops increasing and starts decreasing includes means for storing data corresponding to the amount of light reflected back to the light source at each of a plurality of distances between said lens means and the surface, means for comparing the stored data for a plurality of distances, and means for determining when the stored data indicates that the light reflected back to said source of light stops increasing and starts decreasing.

99. An apparatus as set forth in claim 90 wherein said drive means is operable to vary the distance between said lens means and the surface of the covering of material through a series of incremental distances, said means for detecting when the amount of light reflected back to said light source stops increasing and starts decreasing includes a series of data storage locations, means for transmitting to said data storage locations data indicative of the amount of light reflected back to said storage of light at a plurality of incremental distances, said means for transmitting data to said data storage locations including means for entering data for each incremental distance in turn into a first one of said data storage locations and means for shifting data from each data storage location to a next data storage location in the series of data storage locations and for effecting the removal of the data in a last one of the data storage locations from the series of data storage locations whenever data is to be entered into the first data storage location, and means for comparing the data stored in the first data storage location with the data stored in the last storage location to determine when the data stored in the first data storage location is indicative of an amount of light which is less than the amount of light indicated by the data stored in the last data storage location.

100. An apparatus for use in applying a covering of material to at least a portion of a workpiece, said apparatus comprising gripper means for holding the workpiece, spray means for directing a flow of material toward the workpiece while it is held by said gripper means, drive means for effecting relative movement between said spray means and said gripper means, sensor means for detecting the location of a point on the surface of a covering of material applied to the workpiece by said spray means while the workpiece is held by said gripper means, said sensor means including a source of light and lens means for directing light from the source of light against the surface of the covering of material and for directing light reflected from the surface back to said source of light, said drive means including means for varying the distance between said lens means and the surface of the covering of material in a first direction to first increase the amount of light reflected back to said source of light and to subsequently decrease the amount of light reflected back to said source of light from the surface, said sensor means further including means for detecting when the amount of light reflected back to said light source stops increasing and starts decreasing as the distance between said lens means and the surface is varied in the first direction to detect when said lens means is spaced apart from the surface by a predetermined distance, and control means connected with said spray means, drive means, and sensor means for effecting operation of said spray means to apply to the workpiece a covering having a point on its outer surface which is disposed in a predetermined location relative to the workpiece.

101. An apparatus as set forth in claim 100 wherein said control means includes means for effecting operation of said spray means in such a manner as to effect the application to the workpiece of a covering having different thicknesses over different surface areas of the workpiece.

102. An apparatus as set forth in claim 100 wherein said control means includes means for effecting operation of said spray means in such a manner as to effect the application of a covering of substantially uniform thickness over at least a portion of the workpiece.

103. An apparatus as set forth in claim 100 wherein said drive means includes means for effecting rotational movement between said spray means and the workpiece about each of three transversely extending axes.

104. An apparatus as set forth in claim 100 wherein said control means is operable to effect operation of said drive means to cause relative movement between said spray means and the workpiece in such a manner as to apply a first layer of the covering in strips, said control means being operable to effect operation of said drive means to cause relative movement between said spray means and the workpiece in such a manner as to apply a second layer of the covering in strips which overlie the strips of the first layer of the covering and have longitudinal central axes which are offset from longitudinal central axes of the strips of the first layer of the covering to thereby facilitate the application to the workpiece of a covering having a desired thickness.

105. An apparatus as set forth in claim 100 wherein the workpiece has an internal passage, said apparatus further including means for causing cooling fluid to flow through the internal passage in the workpiece during the application of the covering to the workpiece.

106. An apparatus as set forth in claim 100 further including means for supplying to said spray means powdered material having a first composition, means for applying to said spray means powdered material having a second composition, said control means including means for effecting operation of said spray means to apply a first covering of the first composition over the workpiece, for effecting operation of said spray means to apply a transition covering which is a mixture of the first and second composition over the first covering, and for effecting operation of said spray means to apply a second covering of the second composition over the transition covering.

107. An apparatus as set forth in claim 100 wherein said means for varying the distance between said lens means and the surface of the covering of material includes means for varying the distance through a series of incremental distances, said means for detecting when the amount of light reflected back to said light source stops increasing and starts decreasing includes a series of data storage locations, means for transmitting to said data storage locations data indicative of the amount of light reflected back to said source of light at a plurality of incremental distances, said means for transmitting data to said data storage locations including means for entering data for each incremental distance in turn into a first one of said data storage locations and means for shifting data from each data storage location to a next data storage location in the series of data storage locations and for effecting the removal of the data in a last one of the data storage locations from the series of data storage locations whenever data is to be entered into the first data storage location, and means for comparing the data stored in the first data storage location with the data stored in the last data storage location to determine when the data stored in the first data storage location is indicative of an amount of light which is less than the amount of light indicated by the data stored in the last data storage location.

108. An apparatus as set forth in claim 100 wherein said means for detecting when the amount of light reflected back to said light source stops increasing and starts decreasing includes means for storing data corresponding to the amount of light reflected back to the light source at each of a plurality of distances between said lens means and the surface, means for comparing the stored data for a plurality of distances, and means for determining when the stored data indicates that the light reflected back to said source of light stops increasing and starts decreasing.

109. An apparatus for applying a covering of material to at least a portion of a workpiece, said apparatus comprising spray means for directing a flow of material toward the workpiece, drive means for effecting relative movement between said spray means and the workpiece, sensor means for detecting the thickness of a covering of material applied to the workpiece by said spray means, and control means connected with said sensor means and said spray means for comparing the detected thickness of the covering of material with a desired thickness and for regulating the operation of said spray means as a function of the difference between the detected thickness of the covering and the desired thickness of the covering, said control means being operable to effect operation of said drive means to cause relative movement between said spray means and the workpiece in such a manner as to apply a first layer of the covering in strips, said control means being operable to effect operation of said drive means to cause relative movement between said spray means and the workpiece in such a manner as to apply a second layer of the covering in strips which overlie the strips of the first layer of the covering and have longitudinal central axes which are offset from longitudinal central axes of the strips of the first layer of the covering to thereby facilitate the application to the workpiece of a covering having a desired thickness.

110. An apparatus for applying a covering of material to at least a portion of a workpiece, said apparatus comprising spray means for directing a flow of material toward the workpiece, sensor means for detecting the thickness of a covering of material applied to the workpiece by said spray means, drive means for moving said spray means relative to the workpiece along a first path during the application of the covering of material to the workpiece and for moving said sensor means relative to the workpiece along a second path which extends parallel to the first path during detection of the thickness of the covering of material applied to the workpiece, and control means connected with said sensor means and said spray means for comparing the detected thickness of the covering of material with a desired thickness and for regulating the operation of said spray means as a function of the difference between the detected thickness of the covering and the desired thickness of the covering.

111. An apparatus as set forth in claim 110 wherein said drive means is operable to move said sensor means along said second path independently of movement of said spray means along said first path.

112. An apparatus as set forth in claim 110 wherein said drive means includes first motor means for effecting relative movement between the workpiece and said spray means along a first axis and second motor means for effecting rotational movement of the workpiece about the first axis.

113. An apparatus for applying a covering of material to at least a portion of a workpiece, said apparatus comprising spray means for directing a flow of material toward the workpiece, drive means for effecting relative movement between the workpiece and said spray means, said drive means including first motor means for effecting relative movement between the workpiece and said spray means along a first axis extending through the workpiece and second motor means for effecting rotational movement of the workpiece relative to said spray means about the first axis, sensor means for detecting the thickness of a covering of material applied to the workpiece by said spray means, and control means connected with said sensor means and said spray means for comparing the detected thickness of the covering of material with a desired thickness and for regulating the operation of said spray means as a function of the difference between the detected thickness of the covering and the desired thickness of the covering.

114. An apparatus as set forth in claim 113 wherein said first motor means is operable to move said spray means relative to the workpiece along a first path which is spaced from the first axis during the application of the covering of material to the workpiece, said apparatus further including third motor means for moving said sensor means relative to the workpiece along a second path which extends parallel to the first path during detection of the thickness of the covering of material applied to the workpiece.

115. An apparatus as set forth in claim 114 wherein said third motor means is operable to move said sensor means along said second path independently of movement of said spray means along said first path.

116. An apparatus as set forth in claim 113 wherein said drive means further includes third motor means for effecting relative movement between the workpiece and said spray means along a second axis which extends perpendicular to said first axis and fourth motor means for effecting rotational movement of the workpiece about the second axis.

117. An apparatus as set forth in claim 116 wherein said drive means further includes fifth motor means for effecting rotational movement between the workpiece and said spray means about a third axis which extends perpendicular to said first and second axis.

118. An apparatus as set forth in claim 117 further including sixth motor means for effecting movement of said sensor means relative to the workpiece independently of relative movement between the workpiece and said spray means.

119. An apparatus for applying a covering of material to at least a portion of a workpiece, said apparatus comprising spray means for directing a flow of material toward the workpiece, sensor means for detecting the thickness of a covering of material applied to the workpiece by said spray means, drive means for effecting relative movement between said sensor means and the workpiece, and control means connected with said sensor means, said drive means and said spray means for comparing the detected thickness of the covering of material with a desired thickness and for regulating the operation of said spray means as a function of the difference between the detected thickness of the covering and the desired thickness of the covering, said sensor means including a lens having a focal point which is located a predetermined distance from said lens, said control means including means for effecting operation of said drive means to effect relative movement between said lens and the workpiece and means for detecting when a surface area on the workpiece is at the focal point of said lens.

120. An apparatus for applying a covering of material to at least a portion of a workpiece, said apparatus comprising spray means for directing a flow of material toward the workpiece, sensor means for detecting the thickness of a covering of material applied to the workpiece by said spray means, and control means connected with said sensor means and said spray means for comparing the detected thickness of the covering of material with a desired thickness and for regulating the operation of said spray means as a function of the difference between the detected thickness of the covering and the desired thickness of the covering, said control means includes means for effecting relative movement between said spray means and the workpiece, means for varying the speed of relative movement between said spray means and the workpiece to vary the amount of material which is applied over different portions of a surface area of the workpiece during relative movement between the workpiece and spray means, and means for effecting operation of said sensor means to detect the thickness of the covering applied over the different portions of the surface area of the workpiece.

121. An apparatus for applying a covering of material to at least a portion of a workpiece, said apparatus comprising spray means for directing a flow of material toward the workpiece, means for supplying to said spray means powdered material having a first composition, means for supplying to said spray means powdered material having a second composition, sensor means for detecting the thickness of a covering of material applied to the workpiece by said spray means, and control means connected with said sensor means and said spray means for comparing the detected thickness of the covering of material with a desired thickness and for regulating the operation of said spray means as a function of the difference between the detected thickness of the covering and the desired thickness of the covering, said control means including means for effecting operation of said spray means to apply a first covering of the first composition over the workpiece, for effecting operation of said spray means to apply a transition covering which is a mixture of the first and second compositions over the first covering, for effecting operation of said spray means to apply a second covering of the second composition over the transition covering, and for effecting operation of said sensor means to detect the combined thickness of the first, transition and second coverings.

122. An apparatus for use in applying a covering of material to at least a portion of an airfoil, said apparatus comprising gripper means for gripping at least one end portion of the airfoil, spray means for applying material to the airfoil while the airfoil is held by said gripper means, means for supplying material in a powdered form to said spray means, said spray means including means for heating the material and directing a flow of the heated material toward the airfoil, first drive means for rotating said gripper means relative to said spray means about a first axis which extends generally parallel to the path of flow of heated material from said spray means to change the orientation of the airfoil relative to said spray means, second drive means for rotating said gripper means relative to said spray means about a second axis which extends transversely to the first axis to change the orientation of the airfoil relative to said spray means, and third drive means for rotating said gripper means relative to said spray means about a third axis which extends transversely to said first and second axes to change the orientation of the airfoil relative to said spray means.

123. An apparatus as set forth in claim 122 further including fourth drive means for moving said gripper means relative to spray means along the first axis to change the distance between the airfoil and said spray means.

124. An apparatus as set forth in claim 122 further including support means connected with said gripper means for supporting said gripper means at a location which is spaced apart from said two of said axes and is disposed on one of said axes.

125. An apparatus as set forth in claim 122 further including fourth drive means for moving said gripper means along the third axis to vary the position of the second axis and the airfoil relative to said spray means.

126. An apparatus as set forth in claim 125 further including fifth drive means for effecting relative movement between said gripper means and said spray means along the second axis to change the position of the airfoil relative to said spray means.

127. An apparatus as set forth in claim 122 further including support means connected with said gripper means for supporting said gripper means at a location which is spaced apart from the first and third axes and is disposed along the second axis.

128. An apparatus as set forth in claim 126 further including sixth drive means for effecting relative movement between said gripper means and said spray means along the first axis to vary the position of the airfoil along the path of flow of material from said spray means.

129. An apparatus as set forth in claim 122 further including fourth drive means for moving said spray means along the second axis to vary the location of the path of flow of material from said spray means relative to said gripper means.

130. An apparatus as set forth in claim 128 further including control means for effecting a variation in the speed of relative movement between said gripper means and said spray means along the second axis to vary the amount of material applied over a surface area of the airfoil during relative movement between the airfoil and spray means.

131. An apparatus as set forth in claim 122 further including sensor means for detecting the thickness of the covering of material applied to the airfoil by said spray means.

132. An apparatus as set forth in claim 131 further including control means connected with said sensor means and said spray means for comparing the detected thickness of the covering of material with a desired thickness and for regulating the operation of said spray means and all of said drive means as a function of the difference between the detected thickness of the covering and the desired thickness of the covering.

133. An apparatus as set forth in claim 132 further including printer means for providing a record of the thickness of the covering of material applied to the airfoil by said spray means.

134. An apparatus as set forth in claim 122 further including control means for controlling the operation of said spray means and all of said drive means to provide an airfoil covering having a thickness which differs from a desired thickness by less than 0.0015 of an inch.

135. An apparatus as set forth in claim 122 wherein the airfoil has an internal passage, said apparatus further including means for causing cooling fluid to flow through the internal passage in the airfoil during the application of heated material to the airfoil by said spray means.

136. An apparatus as set forth in claim 122 wherein said means for supplying material in powdered form to said spray means includes means for supplying powdered material having a first composition to said spray means and means for supplying powdered material having a second composition to said spray means, said apparatus further including control means for effecting operation of said spray means to direct a flow of material having the first composition toward the airfoil while it is held by said gripper means to apply a covering of the first composition to the airfoil, for effecting operation of said spray means to direct a flow of material having the second composition toward the airfoil while it is held by said gripper means to apply a covering of the second composition to the airfoil, and for effecting operation of said spray means to direct a flow of material having a composition which is a mixture of the first and second materials toward the airfoil to apply to the airfoil a covering which is a mixture of the first and second compositions.

137. An apparatus as set forth in claim 122 further including means for detecting the actual thickness of at least a portion of the covering applied to the airfoil, and printer means for providing a record of the actual thickness of the covering applied to at least a portion of the airfoil.

138. An apparatus for use in accurately applying a covering of material to at least a portion of an airfoil, said apparatus comprising spray means for applying material to the airfoil, means for supplying material in a powdered form to said spray means, said spray means including means for heating the material and directing a flow of the heated material toward the airfoil, drive means for effecting relative movement between the airfoil and said spray means to enable the flow of heated material to be distributed over the surface of the airfoil to form a covering, sensor means for detecting the thickness of the covering applied to the airfoil to within less than 0.0005 inches of the actual thickness of the covering, said sensor means including a lens having a focal point which is located a predetermined distance from said lens and means for supplying radiant energy which is directed against the covering by said lens, and control means connected with said spray means, drive means and sensor means for effecting operation of said spray means to apply to the airfoil a covering having a thickness which differs from a desired thickness by less than 0.0015 inches, said control means including means for detecting when a point on the covering is at the focal point of said lens during the directing of radiant energy against the covering by said lens.

139. An apparatus as set forth in claim 138 wherein said control means cooperates with said drive means and said spray means to effect the application of the covering to the airfoil in a plurality of layers each of which is formed by a plurality of strips of material applied by said spray means.

140. An apparatus as set forth in claim 139 wherein said control means cooperates with said spray means and said drive means to effect the application of one of the layers with the longitudinal axes of strips in the one layer offset from the longitudinal axes of strips in a next adjacent layer.

141. An apparatus as set forth in claim 138 wherein said means for supplying material in a powdered form to said spray means includes means for supplying powdered material having a first composition to said spray means and means for supplying powdered material having a second composition to said spray means, said control means including means for effecting operation of said spray means to apply a first covering of the first composition over the airfoil, for effecting operation of said spray means to apply a transition covering which is a mixture of the first and second compositions over the first covering, and for effecting operation of said spray means to apply a second covering of the second composition over the transition covering to thereby form over the airfoil the covering which differs from a desired thickness by less than 0.0015 inches and is formed by at least the first, transition and second coverings.

142. An apparatus as set forth in claim 138 wherein the airfoil has an internal passage, said apparatus further including means for causing cooling fluid to flow through the internal passage in the airfoil during the application of the heated material to the airfoil.

143. An apparatus for applying a covering having a predetermined thickness to at least a portion of a workpiece, said apparatus comprising gripper means for holding the workpiece, spray means for directing a flow of material toward the workpiece while it is held by said gripper means, means for supplying said spray means with the material in powdered form, said spray means including means for heating the material and means for directing a flow of the heated material toward the workpiece, drive means for effecting relative movement between said spray means and said gripper means during operation of said spray means to effect the application of a covering of the material to the workpiece, sensor means for sensing the thickness of the covering of material applied to the workpiece without engaging the covering with a solid object and while the workpiece is held by said gripper means, said sensor means including a source of electrical energy and means for utilizing energy from said source of electrical energy to detect the thickness of the covering, and control means connected with said spary means, drive means and sensor means for effecting operation of said spray means and drive means to apply to the workpiece an initial covering having a thickness which is less than the predetermined thickness, for interrupting operation of said spray means after application of the initial covering to the workpiece, for effecting operation of said sensor means to sense the thickness of the initial covering, and for again effecting operation of said spray means and drive means to increase the thickness of the initial covering to the predetermined thickness.

144. An apparatus as set forth in claim 143 wherein said control means includes means for effecting operation of said sensor means to sense the thickness of the initial covering at a plurality of points on the workpiece.

145. An apparatus as set forth in claim 143 wherein said drive means includes first motor means for effecting relative movement between the workpiece and said spray means along a first axis extending transversely to the flow of material and during operation of said spray means and second motor means for effecting rotational movement of the workpiece about the first axis.

146. An apparatus as set forth in claim 143 wherein said drive means includes motor means for effecting relative movement between said spray means and workpiece along a straight path and for effecting rotational movement between said spray means and workpiece.

147. An apparatus as set forth in claim 143 wherein said means for utilizing said energy includes means for converting electrical energy to radiant energy and means for directing the radiant energy against the covering.

148. An apparatus for use in applying a covering of material to at least a portion of a workpiece, said apparatus comprising gripper means for holding the workpiece, spray means for directing a flow of material toward the workpiece while it is held by said gripper means, drive means for effecting relative movement between said spray means and said gripper means, said drive means including motor means for effecting relative movement between said gripper means and said spray means along a first axis extending transversely to the path of flow of material from said spray means and for effecting rotational movement between said gripper means and said spray means about the first axis, sensor means for detecting the location of a point on the surface of a covering of material applied to the workpiece by said spray means while the workpiece is held by said gripper means, and control means connected with said spray means, drive means, and sensor means for effecting operation of said spray means to apply to the workpiece a covering having a point on its outer surface which is disposed in a predetermined location relative to the workpiece.

149. An apparatus as set forth in claim 148 wherein said sensor means includes a source of electrical energy and means for utilizing energy from said source of electrical energy to detect the location of the point on the covering of material.

150. An apparatus as set forth in claim 148 wherein said control means includes means for effecting operation of said spray means in such a manner as to effect the application to the workpiece of a covering having different thicknesses over different surface areas of the workpiece.

151. An apparatus as set forth in claim 148 wherein said control means includes means for effecting operation of said spray means in such a manner as to effect the application of a covering of substantially uniform thickness over at least a portion of the workpiece.

152. An apparatus as set forth in claim 148 wherein said control means is operable to effect operation of said drive means to cause relative movement between said spray means and the workpiece in such a manner as to apply a first layer of the covering in strips, said control means being operable to effect operation of said drive means to cause relative movement between said spray means and the workpiece in such a manner as to apply a second layer of the covering in strips which overlie the strips of the first layer of the covering and have longitudinal central axes which are offset from longitudinal central axes of the strips of the first layer of the covering to thereby facilitate the application to the workpiece of a covering having a desired thickness.

153. An apparatus as set forth in claim 148 wherein the workpiece has an internal passage, said apparatus further including means for causing cooling fluid to flow through the internal passage in the workpiece during the application of the covering to the workpiece.

154. An apparatus as set forth in claim 148 further including means for supplying to said spray means powdered material having a first composition, means for supplying to said spray means powdered material having a second composition, said control means including means for effecting operation of said spray means to apply a first covering of the first composition over the workpiece, for effecting operation of said spray means to apply a transition covering which is a mixture of the first and second composition over the first covering, and for effecting operation of said spray means to apply a second covering of the second composition over the transition covering.

155. An apparatus as set forth in claim 148 wherein said sensor means includes means for detecting the location of the point on the surface of the covering to within less than 0.0005 inches of the actual thickness of the covering, said control means being operable to effect operation of said spray means to apply the covering with the point on its outer surface disposed at a location which differs from a desired location by less than 0.0015 inches.

156. An apparatus for use in applying a covering of material to at least a portion of an airfoil, said apparatus comprising spray means for applying material to the airfoil, means for supplying material to said spray means, said spray means including means for heating the material supplied to said spray means and for directing a flow of the heated material toward the airfoil, gripper means for gripping at least one end portion of the airfoil, first drive means for effecting movement of said gripper means and the airfoil relative to said spray means, second drive means for effecting movement of said spray means relative to said gripper means and the airfoil, and control means for controlling operation of said first and second drive means to effect movement of said spray means and said gripper means to vary the spatial relationship between said spray means and the airfoil, said control means including means for effecting operation of said first drive means to move said gripper means and the airfoil along a first axis and to rotate said gripper means and the airfoil about the first axis, said control means including means for effecting operation of said second drive means to move said spray means along a second axis extending transversely to said first axis.

157. An apparatus as set forth in claim 156 further including sensor means for detecting the thickness of a covering of material applied to the airfoil by said spray means.

158. An apparatus as set forth in claim 157 wherein said sensor means includes a source of electrical energy and means for utilizing energy from said source of electrical energy to detect the thickness of the covering.

159. An apparatus as set forth in claim 156 wherein said control means includes means for effecting operation of at least one of said drive means to effect rotational movement between said spray means and said gripper means about said second axis.

160. An apparatus as set forth in claim 159 wherein said control means includes means for effecting operation of at least one of said drive means to effect rotational movement between said spray means and said gripper means about a third axis which extends transversely to said first and second axes.

161. An apparatus as set forth in claim 160 wherein said control means includes means for effecting operation of said spray means and said first and second drive means in such a manner as to effect the application to the airfoil of a covering having different thicknesses over different surface areas of the airfoil.

162. An apparatus as set forth in claim 160 wherein said control means includes means for varying the speed of relative movement between said spray means and the airfoil to vary the amount of material which is applied over a surface area of the airfoil during operation of said spray means.

163. An apparatus as set forth in claim 156 wherein said means for supplying material to said spray means includes means for supplying to said spray means powdered material having a first composition and means for supplying to said spray means powdered material having a second composition, said control means including means for effecting operation of said spray means to apply a first covering of the first composition to the airfoil and for effecting operation of said spray means to apply a second covering of the second material over the first covering.

164. An apparatus as set forth in claim 156 wherein the airfoil has an internal passage, said apparatus further including means for causing cooling fluid to flow through the internal passage in the airfoil during the application of heated material to the airfoil by said spray means.

165. An apparatus as set forth in claim 156 further including detector means for detecting the location of a point on a covering of material applied to the airfoil without engaging the covering and while the airfoil is held by said gripper means.

166. An apparatus for use in applying a covering of material to at least a portion of a workpiece, said apparatus comprising spray means for directing a flow of material toward the workpiece, gripper means for holding the workpiece while material is directed toward the workpiece by said spray means, universal joint means for supporting said gripper means for rotational movement about an axis extending through the workpiece when it is held by said gripper means and for supporting said gripper means for pivotal movement relative to said spray means about a pivot point disposed on the axis to enable the orientation of the workpiece relative to said spray means to be varied, first drive means for rotating said gripper means about the axis which extends through the workpiece to vary the orientation of the workpiece relative to said spray means, and second drive means for pivoting said gripper means in any direction about the pivot point to further vary the orientation of the workpiece relative to said spray means.

167. An apparatus as set forth in claim 166 further including a longitudinally extending support member disposed between and connected with said universal joint means and said gripper means, said second drive means being operable to pivot said support member through at least a portion of a conical plane having its peak at said pivot point.

168. An apparatus as set forth in claim 166 further including third drive means for moving said universal joint means toward and away from said spray means along a first path extending generally parallel to a path of flow of material from said spray means to vary the distance between said spray means and a workpiece held by said gripper means.

169. An apparatus as set forth in claim 168 further including fourth drive means for moving said universal joint means toward and away from said spray means along a second path extending transversely to the path of flow of material from said spray means.

170. An apparatus as set forth in claim 169 further including fifth drive means for effecting relative movement between said spray means and said gripper means along a third path extending transversely to said first and second paths.

171. An apparatus as set forth in claim 170 further including means for effecting operation of said fifth drive means to vary the speed of relative movement between said spray means and the workpiece to vary the amount of material which is applied over a surface area of the workpiece during relative movement between the workpiece and spray means.

172. An apparatus as set forth in claim 166 further including sensor means for detecting the thickness of the covering of material applied to the workpiece by said spray means.

173. An apparatus as set forth in claim 172 wherein said sensor means includes a source of electrical energy and means for utilizing energy from said source of electrical energy to detect the thickness of the covering to within less than 0.0005 inches of the actual thickness of the covering without engaging the covering with a solid object.

174. An apparatus for use in applying a bond covering and a thermal barrier covering over at least a portion of an airfoil, said apparatus including spray means for directing a flow of a first material toward the airfoil to apply the bond covering to the airfoil and for directing a flow of a second material toward the airfoil to apply the thermal barrier covering over the bond covering, said spray means including means for supplying the first material to said spray means in powdered form, means for supplying the second material to said spray means in powdered form, means for heating the first and second materials, and means for directing a flow of heated material toward the airfoil, gripper means for holding the airfoil during the application of the first and second materials to the airfoil by said spray means, drive means for effecting relative movement between said spray means and said gripper means along each of three transversely extending axes and for effecting rotational movement between said spray means and said gripper means about each of three transversely extending axes, sensor means for use in detecting the thickness of the bond covering and the thermal barrier covering while the airfoil is held by said gripper means, and control means connected with said sensor means, said drive means and said spray means for comparing the detected thicknesses of the bond and thermal barrier coverings with desired thicknesses for these coverings and for regulating operation of said spray means and drive means to effect the sequential application of said bond and thermal barrier coverings to the airfoil to form a combined covering having a thickness which differs from a desired thickness by less than 0.0015 inches.

175. An apparatus as set forth in claim 174 wherein said sensor means includes means for sensing the thickness of the bond covering without engaging the bond covering with a solid object and while the airfoil is held by said gripper means and for sensing the thickness of the thermal barrier covering without engaging the thermal barrier covering with a solid object and while the airfoil is held by said gripper means.

176. An apparatus as set forth in claim 174 wherein said control means further includes means for effecting operation of said spray means and drive means to apply a transition covering formed by a mixture of the first and second materials to the airfoil between the bond and thermal barrier coverings.

177. An apparatus as set forth in claim 174 further including printer means for providing a printed record of the detected thicknesses of the bond and thermal barrier coverings.

* * * * *

UNITED STATES PATENT AND TRADEMARK OFFICE
CERTIFICATE OF CORRECTION

PATENT NO. : 4,334,495

DATED : June 15, 1982

INVENTOR(S) : Thomas Derkacs et al.

It is certified that error appears in the above-identified patent and that said Letters Patent are hereby corrected as shown below:

Column 39, line 2, change "storage" to --source--.

Signed and Sealed this

Fifth Day of October 1982

[SEAL]

Attest:

GERALD J. MOSSINGHOFF

Attesting Officer

Commissioner of Patents and Trademarks